(12) United States Patent
He et al.

(10) Patent No.: US 10,608,802 B2
(45) Date of Patent: Mar. 31, 2020

(54) UCI FOR CARRIER AGGREGATION

(71) Applicant: INTEL IP CORPORATION, Santa Clara, CA (US)

(72) Inventors: Hong He, HaiDian District (CN); Seunghee Han, San Jose, CA (US); Alexei Davydov, Nizhny Novgorod (RU); Gang Xiong, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/741,911

(22) PCT Filed: Dec. 23, 2015

(86) PCT No.: PCT/US2015/000292
§ 371 (c)(1),
(2) Date: Jan. 4, 2018

(87) PCT Pub. No.: WO2017/026972
PCT Pub. Date: Feb. 16, 2017

(65) Prior Publication Data
US 2018/0205525 A1    Jul. 19, 2018

Related U.S. Application Data

(60) Provisional application No. 62/202,363, filed on Aug. 7, 2015.

(51) Int. Cl.
*H04L 5/00* (2006.01)
*H04L 1/18* (2006.01)
*H04W 72/04* (2009.01)

(52) U.S. Cl.
CPC .......... *H04L 5/0055* (2013.01); *H04L 1/1861* (2013.01); *H04L 1/1864* (2013.01); *H04L 5/001* (2013.01); *H04W 72/042* (2013.01)

(58) Field of Classification Search
CPC ... H04L 5/0055; H04L 1/1858; H04L 1/1861; H04W 72/042; H04W 72/04
See application file for complete search history.

(56) References Cited

U.S. PATENT DOCUMENTS

| | | | |
|---|---|---|---|
| 2011/0200000 A1* | 8/2011 | Nishio | H04J 11/00 370/329 |
| 2011/0317652 A1 | 12/2011 | Kim et al. | |
| 2012/0159279 A1* | 6/2012 | Braithwaite | H04B 7/15507 714/751 |

(Continued)

OTHER PUBLICATIONS

3GPP TS 36.211 V10.7.0 (Feb. 2013); "Technical Specification Group Radio Access Network; Evolved Universal Terrestrial Radio Access (E-UTRA); Physical Channels and Modulation (Release 10)," 101 pages.

(Continued)

*Primary Examiner* — Khaled M Kassim
*Assistant Examiner* — Syed Ali
(74) *Attorney, Agent, or Firm* — Fish & Richardson P.C.

(57) ABSTRACT

Embodiments relates to a user equipment for wireless communication; the user equipment comprising logic to: allocate a first resource for transmitting a physical uplink shared channel (PUSCH); process received signalling comprising an indication of an Acknowledgement/Negative Acknowledgement (ACK/NACK) resource mapping mode on the PUSCH; and determine resource elements for transmitting ACK/NACK information based, at least in part, on the first resource block for transmitting the PUSCH and the received ACK/NACK resource mapping mode on the PUSCH; and transmit the ACK/NACK information on the determined resource elements.

4 Claims, 13 Drawing Sheets

(56) References Cited

U.S. PATENT DOCUMENTS

| | | | |
|---|---|---|---|
| 2012/0327885 A1* | 12/2012 | Chung | H04L 1/1614 370/329 |
| 2013/0064212 A1* | 3/2013 | Ogawa | H04L 5/0023 370/329 |
| 2013/0100921 A1* | 4/2013 | Nakao | H04L 5/001 370/329 |
| 2013/0114563 A1* | 5/2013 | Oizunni | H04L 5/001 370/329 |
| 2013/0156011 A1* | 6/2013 | Suzuki | H04L 1/1858 370/335 |
| 2013/0176982 A1* | 7/2013 | Han | H04L 1/1861 370/329 |
| 2014/0078944 A1* | 3/2014 | Yang | H04L 5/001 370/280 |
| 2015/0011236 A1* | 1/2015 | Kazmi | H04B 17/27 455/456.1 |
| 2015/0029964 A1* | 1/2015 | Seo | H04L 1/0027 370/329 |
| 2016/0037352 A1* | 2/2016 | Wei | H04W 72/0453 455/454 |
| 2018/0198567 A1* | 7/2018 | Huss | H04L 1/1829 |
| 2018/0227938 A1* | 8/2018 | Lee | H04L 5/00 |
| 2019/0028313 A1* | 1/2019 | Takeda | H04W 72/04 |

OTHER PUBLICATIONS

3GPP TS 36.211 V8.9.0 (Dec. 2009); "Technical Specification Group Radio Access Network; Evolved Universal Terrestrial Radio Access (E-UTRA); Physical Channels and Modulation (Release 8)," 83 pages.

International Search Report and Written Opinion for International Patent Application No. PCT/US2015/000292 dated May 2, 2016; 57 pages.

* cited by examiner

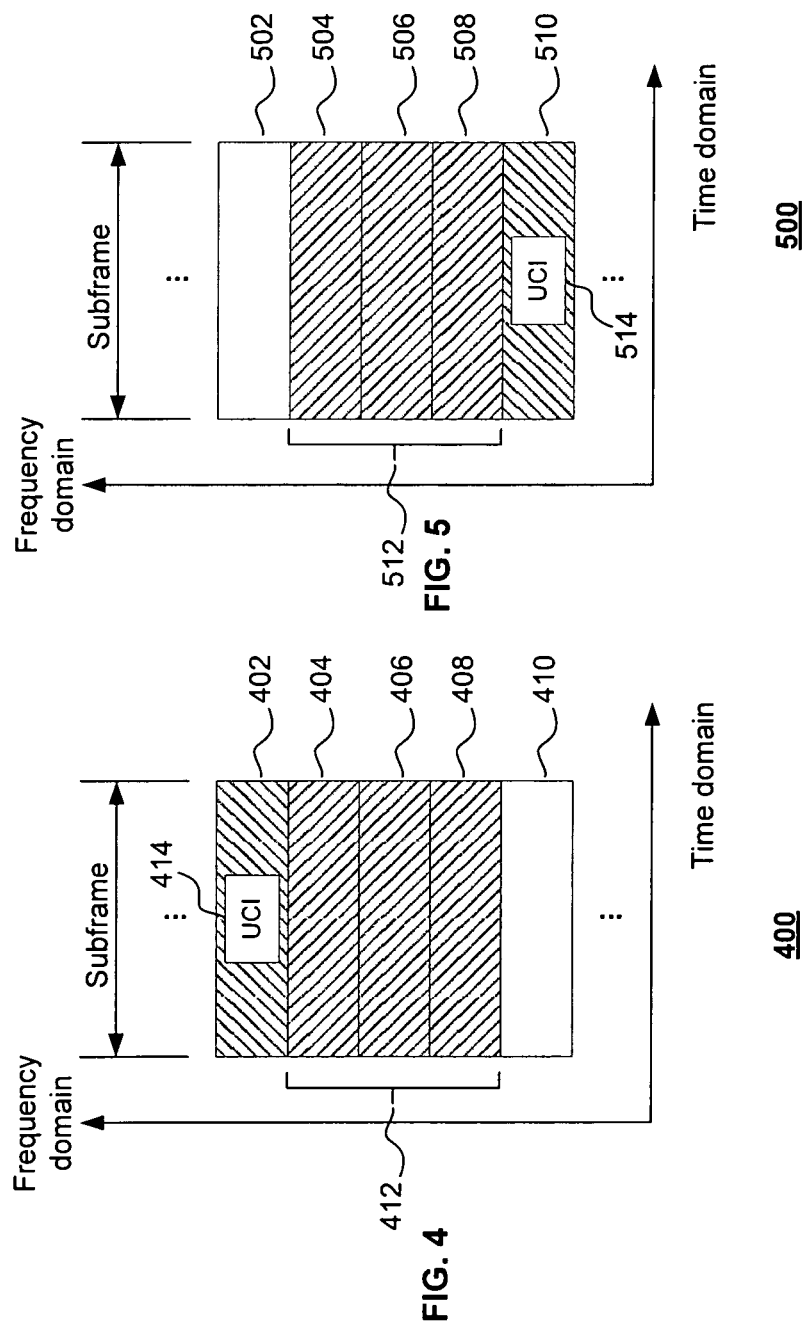

UCI FOR CARRIER AGGREGATION

CROSS REFERENCE TO RELATED APPLICATIONS

The present application is a national phase entry under 35 U.S.C. § 371 of International Application No. PCT/US2015/000292, filed Dec. 23, 2015, entitled "UCI FOR CARRIER AGGREGATION", which claims priority to U.S. Provisional Patent Application No. 62/202,363, filed Aug. 7, 2015, entitled "A NOVEL METHOD AND SYSTEM FOR UCI TRANSMISSION ON PUSCH FOR CARRIER AGGREGATION", the entire disclosures of which are hereby incorporated by reference in their entireties.

BACKGROUND

Carrier aggregation (CA) using up to 5 carriers of the same frame structure is supported in Long Term Evolution-Advanced Release 10 (LTE-Rel-10) as can be appreciated from, for example, 3GPP TS 36.211, v10.7.0. More LTE capacity is needed due to interference and the volume of data delivered as the number of LTE devices increases. 3GPP is considering supporting wider spectrum bands at the user equipment (UE) side to boost the peak data rate performance by standardizing enhanced CA using up to 32 component carriers (CC) in the C-band (3.4 to 4.2 GHz) licensed band and 5 GHz (with approximately 500 MHz of unlicensed spectrum) to provide more resources for data capabilities and better manage interference.

In LTE Rel-8, 3GPP TS 36.211, v8.9.0, a single layer Physical Uplink Shared channel (PUSCH) is supported. When Uplink Control Information (UCI) is due in the same subframe as a scheduled PUSCH, the Uplink Control Information is multiplexed with data. More specifically, the number of resource elements (RE) for Hybrid Automatic Repeat Request (HARQ) Acknowledgement/Negative Acknowledgement (ACK/NACK) piggybacked on PUSCH has an upper bound of 4 DFT-S-OFDM symbols near to a reference signal (RS) for better channel estimation. For up to a 21-bit ACK/NACK, such an upper boundary would be sufficient to provide reliable communications.

In RAN1 #81, it was agreed that the maximum ACK/NACK codebook size for 32 downlink (DL) component carriers (CC) is at least 128 bits for Time Division Duplex (TDD) and 64 bits for Frequency Division Duplex (FDD). Additionally, the ACK/NACK payload was increased further accounting for at least an 8-bit Cyclic Redundancy Check (CRC) attachment. Considering the substantially larger ACK/NACK payload size, a 3 to 6 fold increase, the available REs in 4 DFT-S-OFDM symbols might become insufficient for ACK/NACK multiplexing on PUSCH to meet a predetermined reliability.

BRIEF DESCRIPTION OF THE DRAWINGS

Aspects, features and advantages of embodiments will be apparent from the following description given in reference to the appended drawings in which like numerals denote like elements and in which:

FIGS. 4 and 5 illustrate a number of resource blocks according to embodiments.

DETAILED DESCRIPTION

Figure 1:
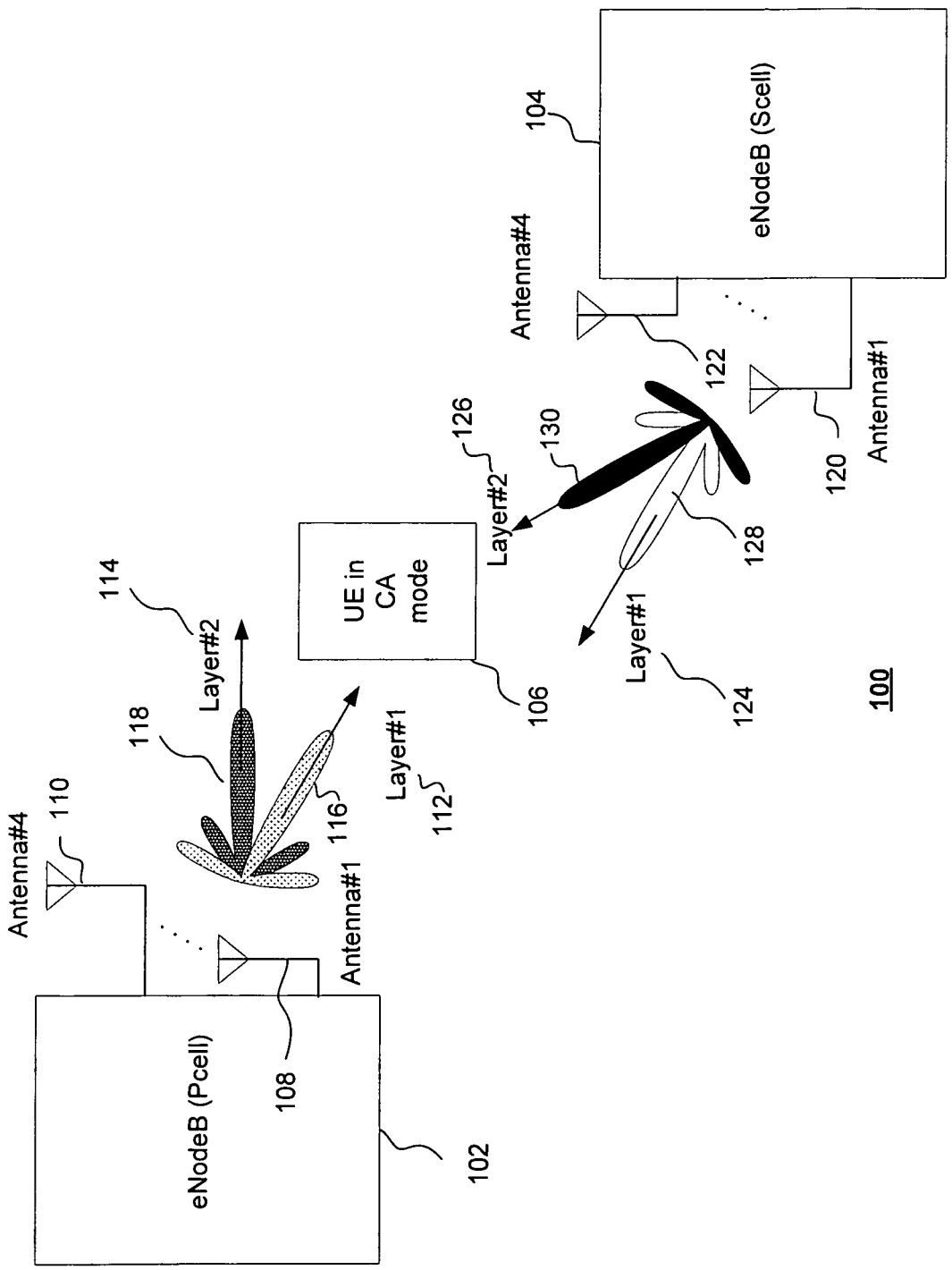
FIG. 1 illustrates a communication system.

FIG. 1 shows a communication system 100 according to an embodiment. The communication system 100 comprises a primary eNodeB (eNB) 102 and a secondary eNB 104 communicating with a user equipment (UE) 106. The communications can be realised using carrier aggregation on Long Term Evolution Advanced as prescribed in, for example, 3GPP TS 36.808, v10.1.0. The primary eNB 102 is known as a Primary Cell (PCell). The secondary eNB 104 is known as a Secondary Cell (SCell). Embodiments can be realised that provide one Secondary Cell or number of Secondary Cells.

In general, the eNBs 102 and 104 can operate in a single user (SU) mode, in a Multiple Input Multiple Output (MIMO) mode, without or without beam forming. In the illustrated embodiment, it can be appreciated that the PCell 102 is operating using a Single User, Multiple Input Multiple Output (SU-MIMO) mode. The PCell 102 can have one or more than one antenna 108 to 110. The PCell 102 has been illustrated as comprising a number of antennas such as, for example, 4 antennas, only two 108 and 110 of which are shown. The PCell 102, to increase the data rate with the UE 106, can use a number of layers 112 to 114 in communicating with the UE 106. The embodiment depicted uses two such layers 112 to 114. Each layer can be conveyed using respective beam patterns associated with the antennas 108 to 110. In the embodiment shown, beamforming is used in supporting the communication with the UE 106, as can be appreciated from the shaped beam patterns 116 to 118.

Similarly, in the illustrated embodiment, it can be appreciated that the SCell 104 is operating using SU-MIMO. The SCell 104 can have one or more than one antenna 120 to 122. The SCell 104 has been illustrated as comprising a number of antennas such as, for example, 4 antennas, only two 120 and 122 of which are shown. The SCell 104, to increase the data rate with the UE 106, can use a number of layers 124 to 126 in communicating with the UE 106. The embodiment depicted uses two such layers 124 to 126. Each layer can be conveyed using respective beam patterns associated with the antennas 120 to 122. In the embodiment shown, beamforming is used in supporting the communication with the UE 106, as can be appreciated from the shaped beam patterns 128 to 130. It should be noted that PCell and SCell configured for a single UE e.g. UE 106 may be operated by a single eNB e.g. eNB 102.

Figure 2:
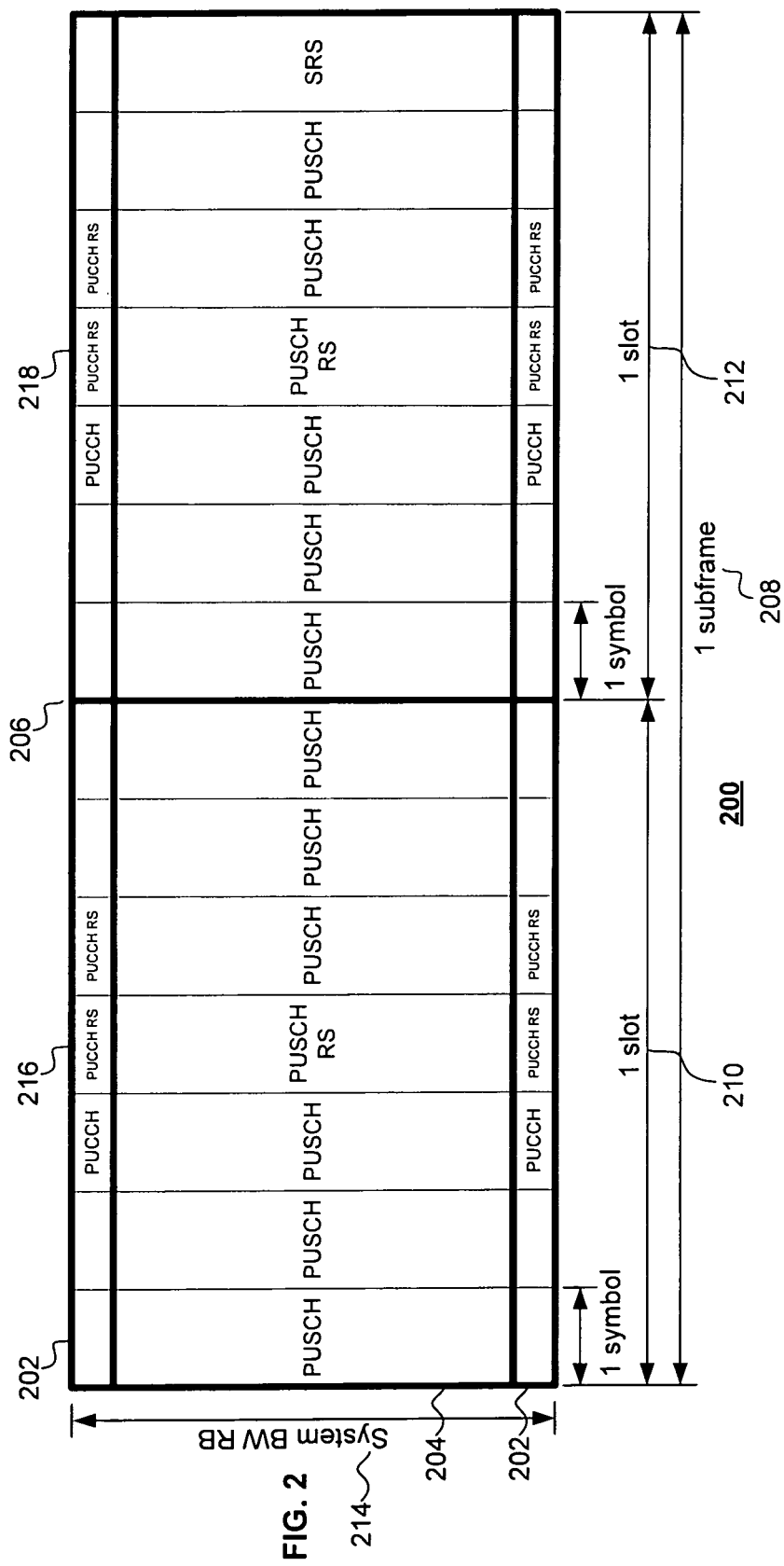
FIG. 2 shows physical uplink channels.

The PCell 102 communicates with the UE 106 using a number of channels. The channels comprise downlink (DL) channels and uplink (UL) channels. FIG. 2 shows a view 200 of such uplink channels. The uplink channels comprise a Physical Uplink Control Channel (PUCCH) 202 and a Physical Uplink Shared Channel (PUSCH) 204.

The channels 202 and 204 are structured in the form of resource blocks. A single resource block 206 is shown. The resource block 206 spans one subframe 208 of 1 ms in duration. The subframe 208 comprises two time slots 210 and 212. Each slot 210 and 212 comprises a number of symbols. In the embodiment shown, each slot 210 and 212 comprises 7 symbols in case of normal Cyclic Prefix (CP). The symbols are Single Carrier Frequency Division Multiple Access (SC-FDMA) symbols or DFT-S-OFDM symbols. The DFT-S-OFDM symbols span a corresponding frequency bandwidth 214.

Each time slot 210 and 212 can comprise one or more than one reference signal 216 and 218. In the present example, the reference signals 216 and 218 are carried using the central symbols.

Figure 3:
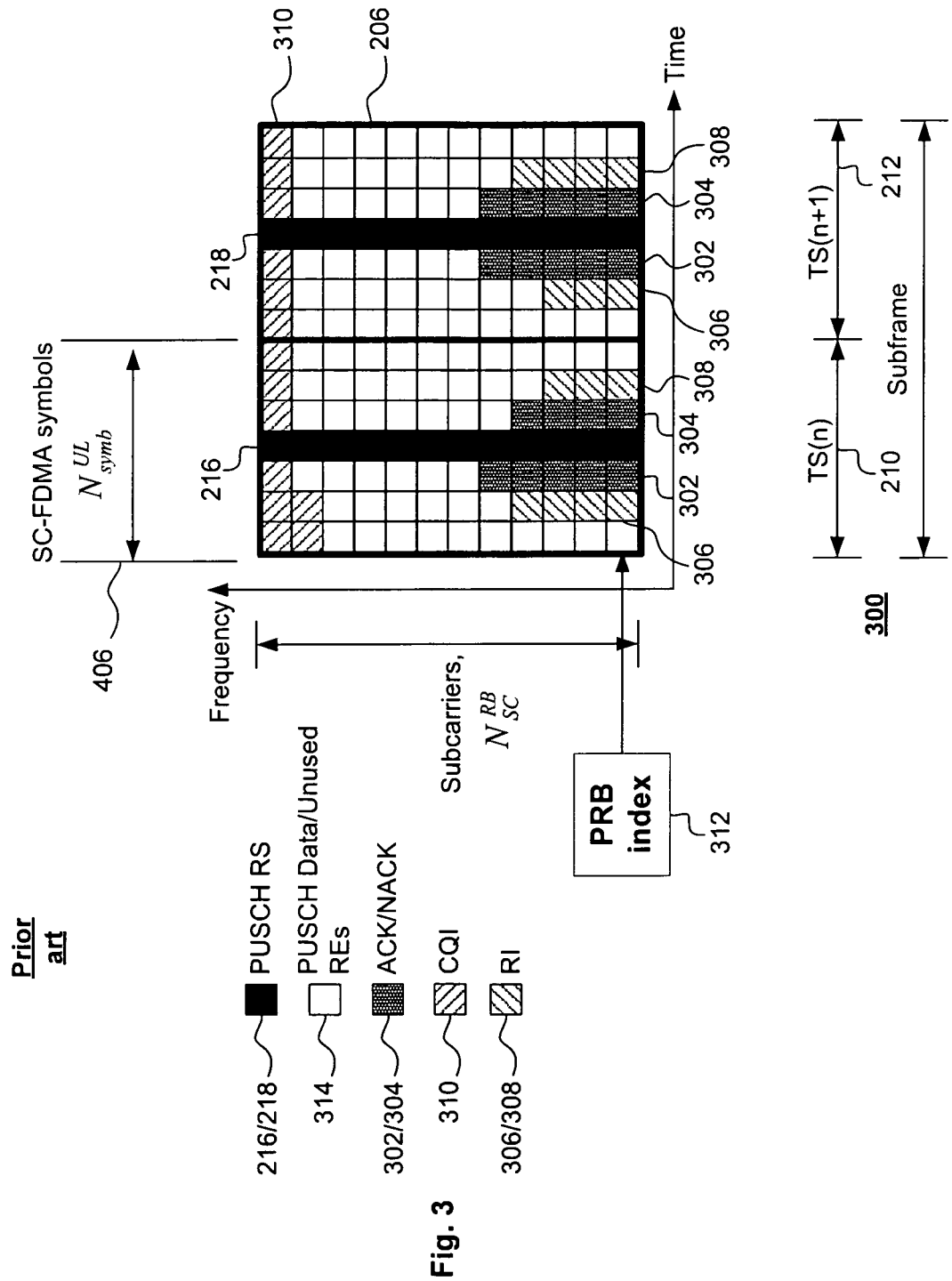
FIG. 3 depicts a resource block of the physical uplink channels according to embodiments.

As can be seen from FIG. 3, disposed either side of the reference signals 216 and 218 are regions of resource elements that are used to carry Uplink Control Information. Immediately adjacent to the reference signals are DFT-S-OFDM symbols 302 and 304 that carry ACK/NACK information. Penultimate adjacent DFT-S-OFDM symbols 306 and 308 can further carry other UCI such as, for example, Rank Indicator (RI) information. The RI can provide an indication of the number of layers associated with a transmission. Furthermore, still further resource elements 310 that span one or more than one symbol can be used to carry a still further type of UCI such as, for example, Channel Quality Information (CQI). The CQI can comprise an index associated with a modulation and coding scheme (MCS) for which a Block Error Rate (BLER)≤0.1 can be realised. Also shown is an index 312 marking the beginning of the resource block. In the embodiment illustrated, the index 312 is a Physical Resource Block (PRB) index.

The remaining resource elements 314 can be either unused in the present example or can be used to carry data on PUSCH.

Referring again the symbols 302 and 304 for carrying ACK/NACK information, in a carrier aggregation, or other multi-carrier, communication mode comprising a number of component carriers, ACK/NACK information is provided for each component carrier. There is an upper bound on the number of component carriers that can be accommodated within the art. In current LTE systems, that upper bound is presently 5 component carriers, which means further ACK/NACK information for more than 5 component carriers would not carried on the PUSCH.

In the illustrated embodiment, it can be seen that symbols 302 and 304 in the first time slot 210 and in the second time slot 212 can be used to transmit the ACK/NACK information corresponding to up to 5 component carriers. Once all resource elements reserved for such ACK/NACK information have been used due to the UE receiving, or processing UCI for, up to 5 component carriers, the UE cannot transmit more UCI on the PUSCH to an eNB or to the eNB 102 and 104 eNB.

Therefore, referring to FIG. 4, there is shown a view of 400 of a number of resource blocks according to embodiments. In the illustrated example, five resource blocks 402 to 410 are shown. A set 412 of resource blocks have been or can be allocated to the UE for UL data transmission on the PUSCH. In the embodiment shown, three such resource blocks have been allocated; namely resource blocks 404 to 408 have been allocated for PUSCH transmission. Embodiments can be realised according to the following approach. For carrier aggregation with more than 5 component carriers, if the UE 106 is not configured for simultaneous PUSCH and PUCCH transmission, one or more than one adjacent resource block or adjacent resource blocks can be allocated to provide additional resources for ACK/NACK transmission during multi-component carrier operation. Embodiments can be realised in which the one or more than one resource block allocated as providing additional resources for ACK/NACK information comprise one or more than one resource block having a predetermined disposition relative to the set of PUSCH resource blocks allocated to the UE. Such a predetermined disposition can comprise one or more than one resource block disposed adjacent to the set of PUSCH resource blocks 412 allocated to the UE 106. The upper resource block 402 is an example of such an adjacent resource block, disposed adjacent to the PUSCH resource blocks 412, that can be used to carry UCI 414 such as, for example, ACK/NACK information. The adjacent one or more than one resource block 402 can form part of a Physical Resource Block having an index that is the next highest PRB relative to the highest PRB allocated to the UE 106 for PUSCH.

Alternatively, or additionally, a resource block having such a predetermined disposition relative to the PUSCH resources 412 can comprise, for example, an adjacent one or more than one resource block allocated for providing additional resources for ACK/NACK transmission associated with the next lowest PRB relative to the lowest PRB allocated to the UE 106 for PUSCH. Such an embodiment is depicted in FIG. 5.

Referring, therefore, to FIG. 5, there is shown a view of 500 of a number of resource blocks according to embodiments. In the illustrated example, five resource blocks 502 to 510 are shown. A set 512 of resource blocks have been or can be allocated to the UE for PUSCH transmission. In the embodiment shown, three such resource blocks have been allocated; namely resource blocks 504 to 508. Embodiments can be realised according to the following approach. For carrier aggregation with more than 5 component carriers, if the UE 106 is not configured for simultaneous PUSCH and PUCCH transmission, one or more than one adjacent resource block or adjacent resource blocks can be allocated to provide additional resources for ACK/NACK transmission on PUSCH in case of carrier aggregation with more than 5 CCs. Embodiments can be realised in which the one or more than one resource block allocated as providing additional resources for ACK/NACK information comprises one or more than one resource block having a predetermined disposition relative to the set of the PUSCH resource blocks allocated to the UE. Such a predetermined disposition can comprise one or more than one resource block disposed adjacent to the set of PUSCH resource block 512 allocated to the UE 106. The lower resource block 510 is an example of such an adjacent resource block, disposed adjacent to the PUSCH resource blocks, that can be used to carry UCI 514 such as, for example, ACK/NACK information. The adjacent one or more than one resource block 510 can form part of a Physical Resource Block having an index that is the next lowest PRB relative to the lowest PRB allocated to the UE 106 for PUSCH.

Embodiments that use such adjacent resource blocks 402 and 510 can be arranged so that the associated uplink resource blocks 412/512 used for PUSCH transmission and resource blocks 402/510 used for the UCI 414/514 transmission can be processed using a common or single Discrete Fourier Transform (DFT) due to the resource blocks 402/510 being adjacent to the PUSCH resource blocks 402 to 408 and/or 504 to 508.

Figure 6:
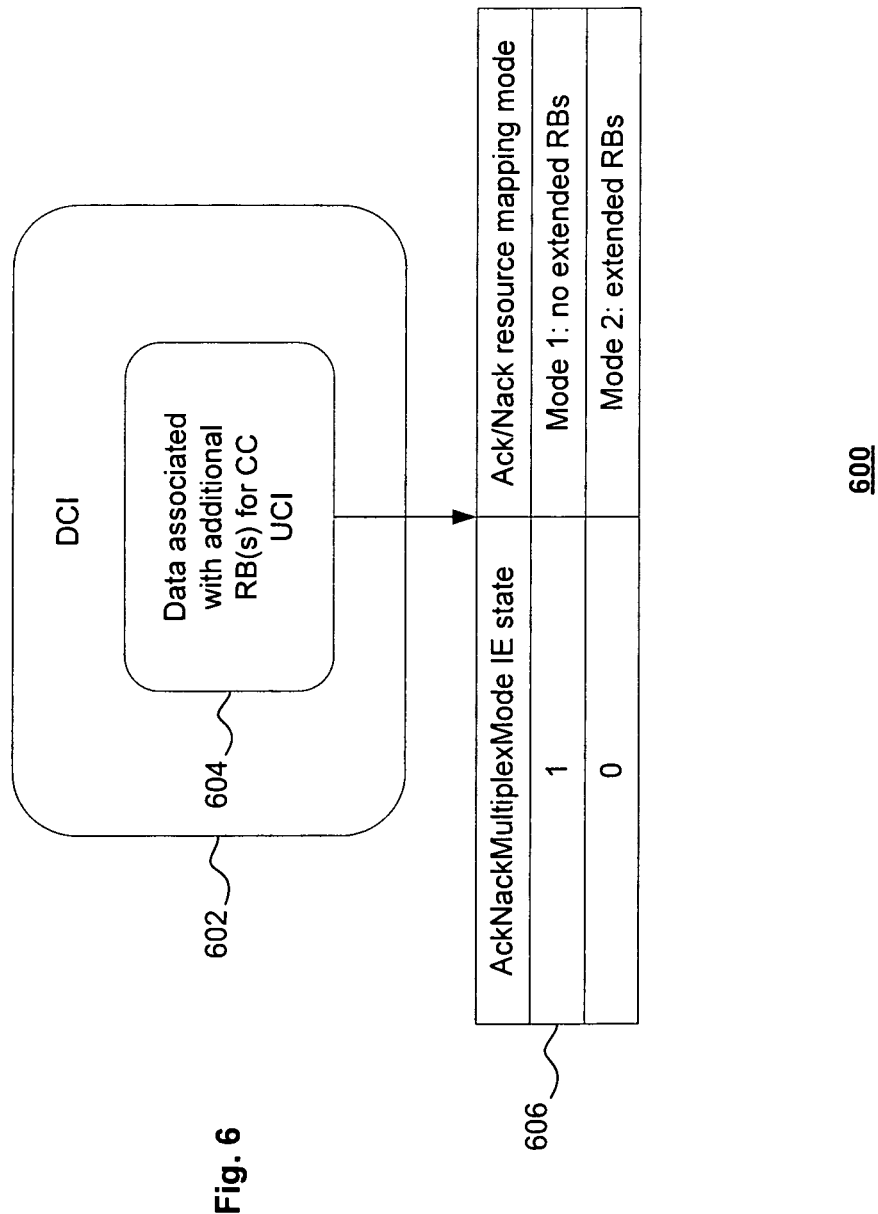
FIG. 6 shows a message according to embodiments.

Referring to FIG. 6, there is shown a view 600 of a message 602 for informing the UE 106 of the location of the additional resources to be used for carrying UCI information. The message 602 can be a Downlink Control Information (DCI) message having a respective or predefined format. In the embodiment illustrated, the message 602 comprises data (i.e. an information field) 604 signalling the resources or locations to be used for UCI or ACK/NACK information transmission. The UCI can comprise at least one of ACK/NACK information, Channel Quality Indicator (CQI) information or RI information taken jointly and severally in any and all permutations. The data or information field 604 indicating the resources or locations to be used for UCI transmission can comprise an index. The index can be used to access information that prescribes uplink resources to be used for conveying UCI such as, for example, ACK/NACK information.

Alternatively, or additionally, the data or the information field 604 signalling the resources or locations to be used for UCI can comprise an indication of which UCI information transmission mode of a plurality of UCI information transmission modes should be used by a UE in performing UCI information transmissions. An example implementation can use a table 606, having a plurality of indices that prescribe UCI information transmission modes. It can be appreciated that the table 606 comprises two indices, that is, '0' and '1', that are associated with respective UCI information transmission modes. Embodiments can be realised in which a first transmission mode of such a plurality of transmission modes can comprise a legacy UCI information transmission mode and a second transmission mode that can comprise a UCI information transmission mode according to embodiments such as, for example, a UCI information transmission mode that uses such an adjacent one or more than one resource block or other prescribed or predetermined resources as described above or other transmission modes as described herein.

Embodiments can be realised in which the exact location of the additional resources can be either fixed or dynamically indicated by means of DCI formats.

Figure 7:
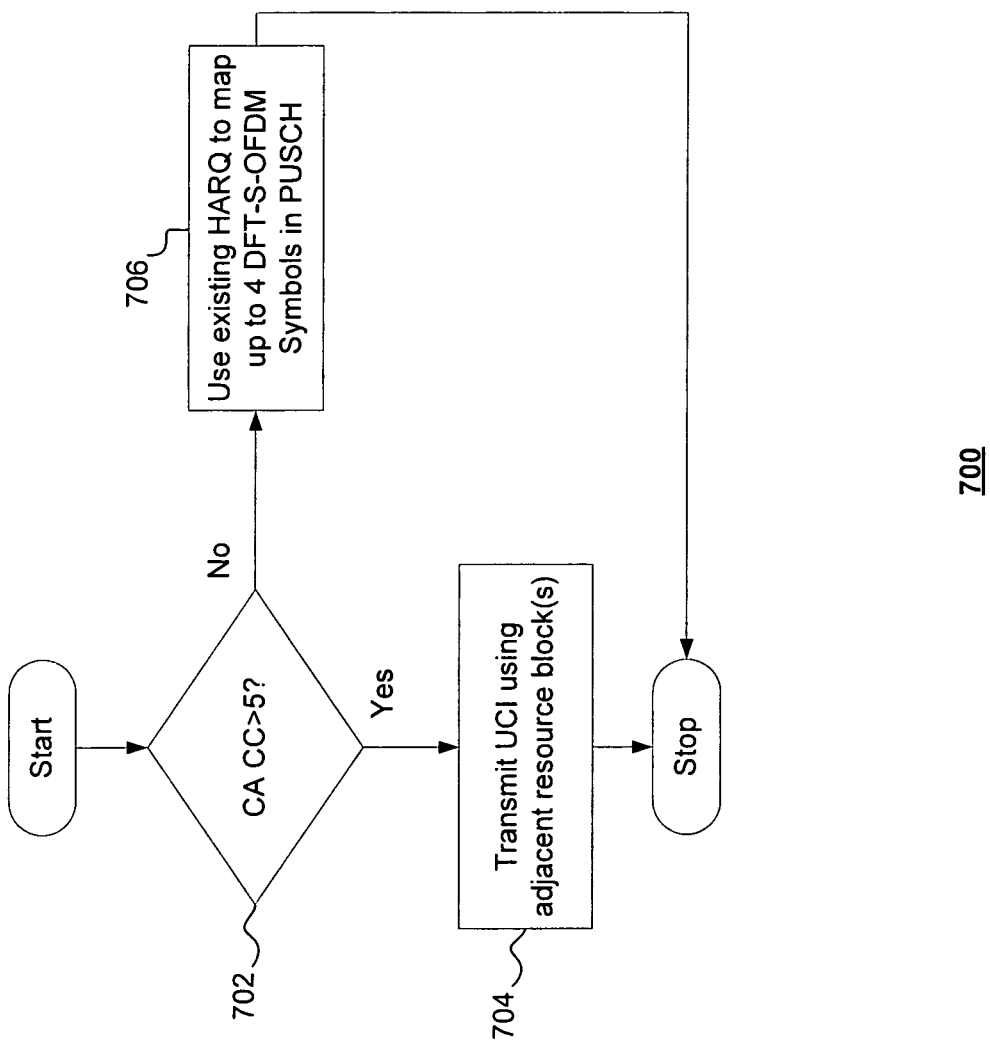
FIG. 7 illustrates a flowchart according to embodiments.

Referring to FIG. 7, there is shown a flowchart 700 for controlling UE UCI information transmissions. The UCIs can be multiplexed with user data on a PUSCH or transmitted in an adjacent one or more than one resource block. A determination is made, at 702, regarding whether or not the UE 106 has been configured to process or receive or is processing or receiving carrier aggregated transmissions using more than five component carriers. If the determination is positive, the UE 106 uses prescribed resources for transmitting the UCI information at 706, that is, a UCI transmission mode that uses a prescribed resource mapping. The prescribed resource mapping can comprise the above described one or more than one adjacent resource block or other prescribed resources in addition to or instead of the legacy UCI resources such as resources 302 and 304. If the determination, at 702, is negative, the UE 106 uses, at 706, a legacy mode for UCI transmissions such as, for example, using the existing 4 DPT-S-OFDM symbols of the PUSCH as the UCI information transmission mode.

Therefore, embodiments can be realised that use selectable or switchable UCI transmission modes. Embodiments can switch between using legacy UCI information transmissions and using additional resources such as, for example, using one or more than one adjacent resource block.

Figure 8:
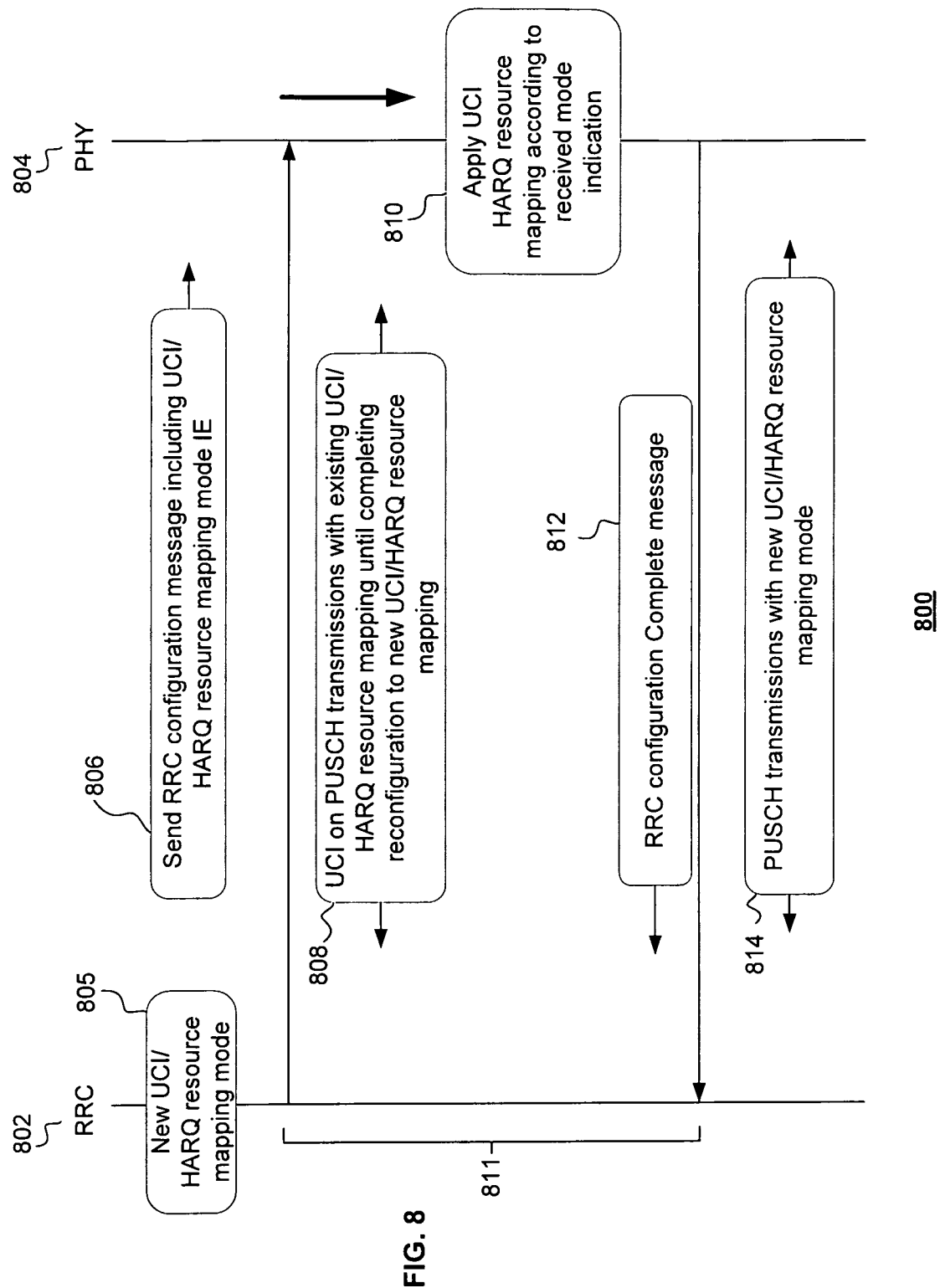
FIG. 8 depicts a protocol according to embodiments.

Referring to FIG. 8, there is shown a view 800 of a communication exchange between a Radio Resource Control layer (RRC) 802 of, or for, a device or system such as, for example, an eNB 102 and/or 104 and a physical layer (PHY) 804 of, or for, a device or system such as, for example, an UE 106. Such an eNB can be an embodiment of any eNB described in this application. Such an UE can be an embodiment of any UE described in this application.

The RRC 802 decides that a change in UCI information format 805 should be adopted, that is, a change in UCI resource mapping mode, and communicates the change to the PHY 804 in a message or other communication 806. Such a decision to effect a change in UCI information format 805 can follow the communication being configured to use carrier aggregation using a predetermined number of component carriers. For example, the communication can be configured to use more than five component carriers. At 808, RRC 802 and PHY 804 continue using the existing UCI information format such as, for example, the existing ACK/NACK for any subsequent transmissions pending the UE 106 reconfiguring to use the prescribed UCI information format 805, while the physical layer is reconfigured at 810, to use the new UCI information format. The reconfiguration can take a finite period of time. Such a finite period of time can be different for different UEs. Therefore, such a reconfiguration can lead to an ambiguity period 811 during which the RRC 802 or eNB is not certain regarding whether or not the PHY or UE has given effect to the instruction to change UCI information format.

At 812, a message indicating that the UE reconfiguration has been completed is sent to the RRC 802, whereupon the RRC 802, or device or system, and the UE can exchange data using the new UCI information format at 814.

Embodiments can be realised in which elements of the UCI information can be decoupled from other elements of the UCI information. For example, when using additional resources such as, for example, one or more than one adjacent RB, for carrying UCI information, ACK/NACK transmissions can be carried by REs of such additional resources or such an adjacent one or more RB whereas the CQI/PMI/RI UCI information can be carried by different resources such as a different RB. For example, embodiments can be realised in which at least one of CQI, PMI or RI are mapped onto the resource elements of the PUSCH resource allocated by a detected UL grant, while the ACK/NACK information are mapped onto the extended RB, that is, one or more than one adjacent RB or other additional resources, without puncturing the uplink shared channel (UL-SCH) REs. In the embodiments, the one or more than one adjacent RB can comprise a number of adjacent or extended resource blocks (RBs). Alternatively, the one or more than one adjacent RB can comprise one adjacent RB. In such single adjacent RB embodiments, the UCI information, such as, for example, the ACK/NACK information can be encoded in a predetermined manner. Such a predetermined manner can comprise, for example, first tail biting convolutionally encoded (TBCC) with a code rate of 1/3 and rate matching by circular repetition to fit into one RB using QPSK modulation.

Alternatively, or additionally, embodiments can be realised in which the number of adjacent RBs is determined as a function of one or more than one predetermined parameter. The predetermined parameter can comprise, for example, a prevailing or selectable modulation and coding scheme (MCS) of a respective channel. The respective channel can comprise, for example, a PUSCH. The one or more than one predetermined parameter can comprise other parameters such as, for example, at least one of a number of ACK/NACK information units and a number of Cyclic Redundancy Check bits. Therefore, an embodiment can be realised in which the number of extended or adjacent RBs, or other additional resources, can be calculated based on a PUSCH MCS and a number of ACK/NACK bits, which can include a number of CRC bits. Furthermore, embodiments can additionally use such TBCC with a code rate of 1/3 and rate matching operation for channel coding. Embodiments can be realised in which the UCI information, such as, for example, the ACK/NACK information, uses the same modulation scheme as the PUSCH.

Embodiments can be realised in which resource elements associated with one type of UCI information are sacrificed or otherwise allocated or reallocated to carry UCI information of another type. For example, embodiments can be realised in which ACK/NACK information is carried using resource elements notionally designated as being for carrying other UCI, such as, for example, at least one of CQI, PMI or RI UCI. Therefore, an example embodiment can provide for ACK/NACK information being carried by PUSCH resource elements normally or notionally associated with carrying RI information. One or more than one resource element normally or notionally associated with carrying RI information can be reallocated for carrying ACK/NACK information. This can particularly be the case when one or more than one resource element normally or notionally allocated for carrying RI information is unused, that is, not presently being used for carrying RI information. In such an embodiment, the ACK/NACK information is multiplexed with other UCI information such as, for example, the RI information.

Figure 9:
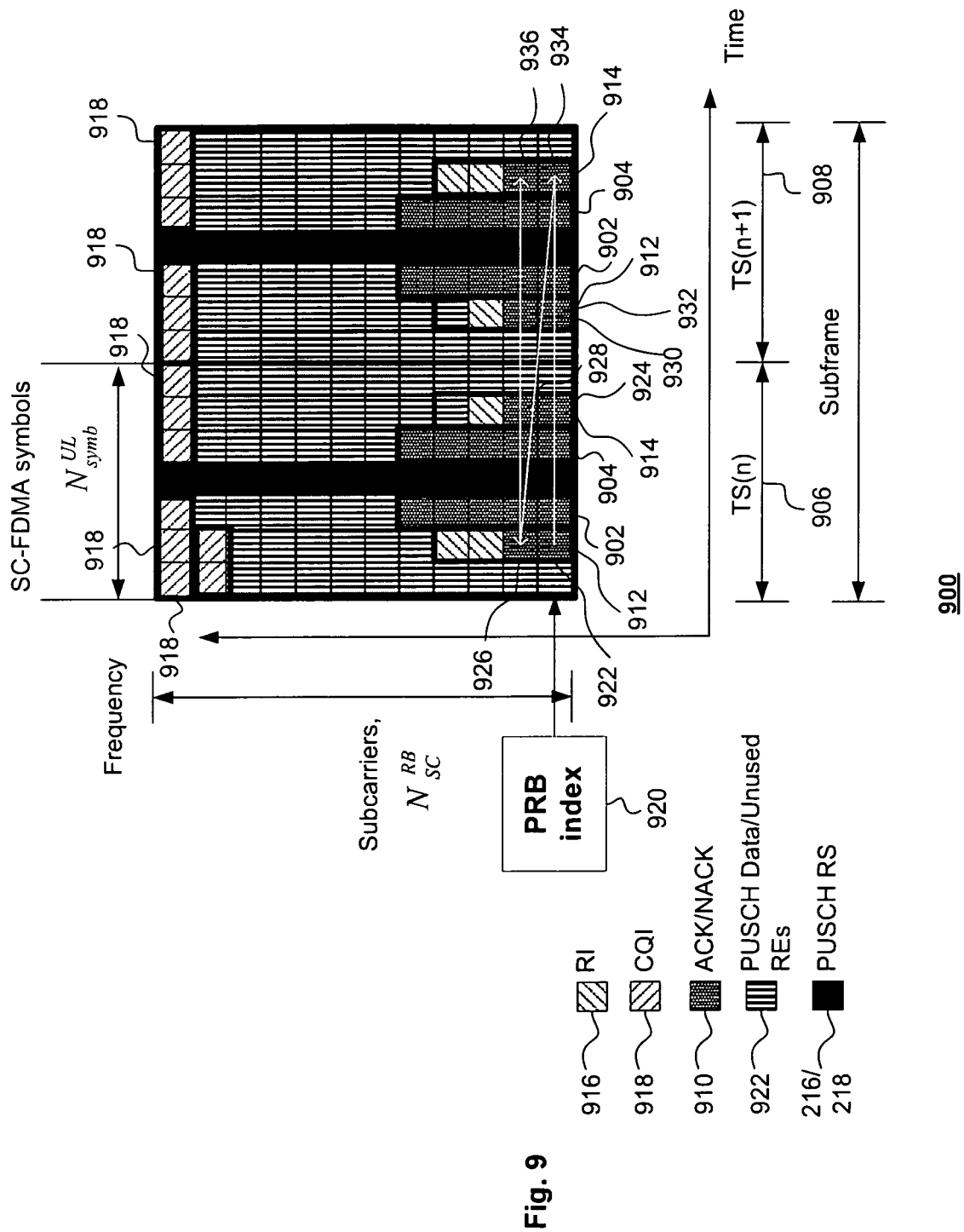
FIG. 9 shows a resource block according to embodiments.

Therefore, referring to FIG. 9, there is shown a view of a PUSCH resource block 900. The resource block 900 may or may not comprise the above reference signals 216 and 218. The resource block 900 comprises a plurality of regions of resource elements that are used to carry respective Uplink Control Information. A first region comprises a number of DFT-S-OFDM symbols 902 and 904 that carry a first type of UCI information. The number of symbols can comprise two symbols. The number of symbols can be carried by a number of slots such as the two slots 906 and 908 depicted. The first type of UCI information can comprise ACK/NACK information. A second region comprises a number of penultimate adjacent DFT-S-OFDM symbols 912 and 914 to carry a second or further type of UCI information. The number of penultimate adjacent symbols can comprise two symbols 912 and 914. The penultimate adjacent symbols can be carried by a respective number of slots such as, for example, the two slots 906 and 908 depicted. The second or further type of UCI information can comprise, for example, Rank Indicator (RI) information 916. The RI information 916 can provide an indication of the number of layers, or number of independent channels, associated with a transmission or transmissions. Embodiments can be realised that carry a still further type of UCI information such as, for example, Channel Quality Indicator (CQI) 918 Information. The CQI 918 can comprise an index associated with a modulation and coding scheme (MCS) for which a predetermined BLER, such as, for example, BLER<0.1, can be realised.

An index 920 can be provided that marks the beginning of the resource block. In the embodiment illustrated, the index 920 is a Physical Resource Block (PRB) index.

The remaining resource elements 922 can be either unused resource elements or can be used to carry PUSCH data.

Referring again the symbols 902 and 904 for carrying ACK/NACK information, in a carrier aggregation, or other multi-carrier, communication mode comprising a number of component carriers, ACK/NACK information is provided for PDSCH transmissions on each component carrier. In the illustrated embodiment, it can be seen that the ACK/NACK information starts to be mapped onto symbols 902 and 904 of the two slots 906 and 908 on a time or row first basis as depicted by the arrows. Once all resource elements in symbols 902 and 904 reserved for ACK/NACK information are in use due to the UE 106 receiving or processing PDSCH on more than 5 component carriers in carrier aggregation, resource elements reserved for carrying other UCI information (e.g. RI 916) can be used for transmitting ACK/NACK information 910. For example, resource elements associated with the second region such as, for example, at least one of regions 912 and 914 can be used to carry ACK/NACK information 910 even if it is normally or notionally reserved for carrying RI information 916. In such embodiments, corresponding resource elements have a multi-function of carrying different types of UCI information at different times. The type of UCI information is therefore selectable according to the intended or selected resource mapping for UCI feedback.

Referring to the first time slot 906 of the two time slots 906 and 908 of the subframe, it can be appreciated that one or more than one resource element normally or notionally reserved for carrying RI information 916 has been allocated and used to carry ACK/NACK information 910. In the embodiment depicted, four resource elements 922, 924, 926 and 928 notionally reserved for carrying RI information 916 have been reallocated or otherwise used to carry ACK/NACK information 910. The reallocated resource elements are not presently needed or are not presently being used for bearing respective UCI information, such as, for example, RI information 916.

Similarly, resource elements of the second time slot 908 can also be, additionally or alternatively, used to carry one type of UCI information notwithstanding being notionally or normally reserved for carrying a different type of UCI information. In the embodiment illustrated, unused resource elements notionally reserved for bearing the different type of UCI information are reallocated for carrying said one type of UCI information. For example, embodiments can be realised in which resource elements normally or notionally reserved for carrying RI information 916 are reallocated for carrying ACK/NACK information 910. In the example depicted, it can be appreciated four resource elements 930 to 936 have been reallocated to bear ACK/NACK information 910 as opposed to carrying RI information 916.

The reallocation can be performed dynamically according to a predetermined reallocation pattern. Embodiments can be realised in which the ACK/NACK information 910 can be assigned to symbols starting from the last two symbols and moving forward in a time-first mapping order while ensuring the ACK/NACK information is present on both slots 906 and 908 in the subframe. Such embodiments can be used when selectable or certain UCI information, such as, for example, RI information 916, is not transmitted in a subframe. Alternatively, or additionally, ACK/NACK information 910 can be assigned starting from the first row and moving downward in a time-first mapping order to reduce a chance of collision between ACK/NACK information 910 and RI information 916.

Although the above embodiments have been described with reference to reallocation resource elements hitherto assigned for carrying RI information 916 to carrying ACK/NACK information 910, embodiments are not limited thereto. Embodiments can be realised in which resources are assigned or reallocated on a symbol basis or on the basis of some other group of resource elements as a unit of resource allocation.

For example, an embodiment can be realised that, for ACK/NACK information 910 associated with carrier aggregation comprising more than five component carriers, allocates or reallocates symbols for carrying that ACK/NACK information using a prescribed vector. The prescribed vector can comprise an ordered set of resource units, such as symbols or other resource unit, to be used to carry such ACK/NACK information 910. Such an order set of resource units can comprise an ordered set of symbols that can be progressively allocated for carrying the ACK/NACK information 910. An example of such an ordered set, which can also be referred to as a vector, can be symbols 2, 9, 8, 3, 1, 10, 7, 4 for a normal cyclic prefix (CP). A further example of such a symbol vector can be symbols 1, 7:6, 2, 0, 8, 5, 4 for an extended CP.

Alternatively, embodiments can be realised that use other symbol vectors. For example, embodiments can be realised in which the symbol vector can comprise symbols 2, 9, 8, 3, 4, 7, 1, 10 for a normal CP. A still further example of such a symbol vector can be symbols 1, 7, 6, 2, 3, 5, 0, 8 for an extended CP.

Alternatively, or additionally, the prescribed resources to be reallocated for carrying ACK/NACK information 910 as opposed to a notional or original type of UCI information can comprise selectable symbols of a such symbol vector. Therefore, for example, embodiments can be realised in which a subset of resources is reallocated to ACK/NACK information transmission selected from such a symbol vector. An example of such selectable symbols can be, for example, symbols 1, 4, 7, 10 selected from symbol vector 1, 2, 3, 4, 7, 8, 9, 10 for a normal CP. A further example of such selectable symbols of a symbol vector can comprise, for example, symbols 0, 3, 5, 8 of symbol vector 0, 1, 2, 3, 5, 6, 7, 8 for an extended CP.

Further embodiments can be realised to avoid, or at least mitigate the chance of, a collision between resource elements allocated for RI information 916 and resources reallocated for ACK/NACK information 910. Such embodiments can change the place of RI symbols within the RB 900. For example, an embodiment can be realised in which a set or vector of symbols, or other resources, reserved for one type of UCI data, such as RI information, is moved so as not to overlap a set or vector of resources for carrying ACK/NACK information. For example, in the case of a normal CP, RI symbols could be limited to symbols 0, 5, 6, 11, with the other symbols normally or notionally allocated to RI information 916 in legacy LTE system being reallocated to carry ACK/NACK information 910.

A further embodiment can be realised in which first and second types of UCI information are jointly encoded and carried using resources normally or notionally allocated or reserved to carry the second type of UCI information and the resources normally or notionally allocated or reserved for carrying the first type of UCI information are reallocated for bearing a third type of UCI information. For example, RI information 916 and CQI 918 and PMI information can be jointly encoded and carried using the region of the RB for carrying the CQI information 918 such as, for example, one or more than one region labelled 918.

Still further embodiments can be realised in which a given type of UCI information, such as, for example, ACK/NACK information 910, is mapped into progressively distal resources commencing with resources that have a predetermined proximity to a reference signal 216, 218 such as, for example, a DM-RS. For example, embodiments can allocate DFT-S-OFDM symbols according to selectable symbol sets chosen from a plurality of symbols sets. In such an approach, the given type of UCI information is mapped in a time-first order, or other prescribed order, on the basis of a plurality of symbol sets such as, for example, starting from symbols Set-0, followed by symbol Set-1, followed by symbol Set-2 and so on. Furthermore, embodiments can be realised such that, within one or more than one such symbol set, mapping the given UCI information, such as, ACK/NACK information, can start from any predetermined symbol within the one or more than one symbol set. Therefore, within one set, ACK/NACK information mapping can be started from any symbol of this set and then followed by another one in the same set in a different slot but the mapping order should be predefined in order to avoid misalignment between the Network (NW) and UE.

For example, assuming a normal CP, the following could represent such a plurality of symbol sets: DFT-S-OFDM symbol Set-0 comprising symbols: 2/4/9/11, DFT-S-OFDM symbol Set-1 comprising symbols: 1/5/8/12, DFT-S-OFDM symbol Set-2 comprising symbols: 0/6/7/13. Further examples, assuming an extended CP, could comprise DFT-S-OFDM symbol Set-0 comprising symbols: 1/3/7/9 and DFT-S-OFDM symbol Set-1 comprising symbols: 0/4/6/10.

Figure 10:
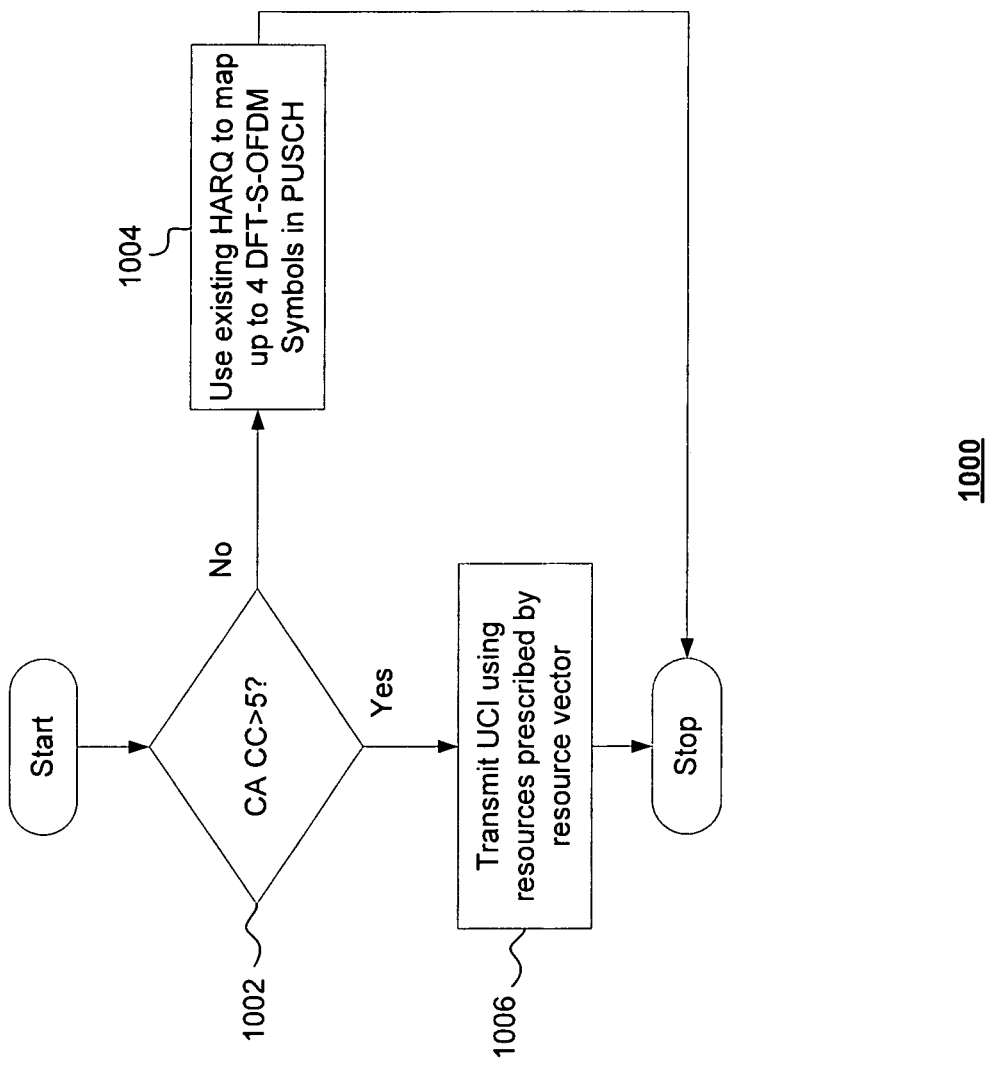
FIG. 10 illustrates a flowchart according to embodiments.

Referring to FIG. 10, there is shown a flowchart 1000 for realising embodiments for reallocating resources normally or notionally designated to carry a first type of UCI information to carrying a second type of UCI information. FIG. 10 will be described with reference to reallocating resources notionally assigned for carrying RI information 916 to carrying ACK/NACK information 910. The UCI information can be multiplexed with user data on a PUSCH. A determination is made, at 1002, regarding whether or not the UE has been configured to process or receive or is processing or receiving carrier aggregation transmissions using more than five component carriers. If the determination made by the UE is negative, then UCI information transmission is effected, at 1004, using legacy resource elements such as, for example, up to 4 DFT-S-OFDM symbols on PUSCH. If the determination made by the UE is positive, the UE uses, at 1006, prescribed resources for transmitting the UCI information (e.g. ACK/NACK symbols). The prescribed resources can comprise the above described resource sets, subsets or symbol vectors. The resources could be resource elements, symbols or some other unit of resource.

Therefore, embodiments can be realised that use selectable or switchable resources for UCI transmissions on a PUSCH. Embodiments can switch between using legacy PUSCH resources reserved for each type of UCI information transmissions and using a prescribed resource set, subset or vector on a PUSCH, as proposed herein.

Further embodiments can be realised that use conditional ACK/NACK compression based on the number of resource elements. Therefore, a UE can perform one or more than one predetermined ACK/NACK bundling operation selected from a plurality of such ACK/NACK bundling operations. Embodiments can be realised in which such a predetermined ACK/NACK bundling operation can be subject to a condition precedent. For example, a UE can perform a corresponding predefined ACK/NACK bundling operation, or limiting such an operation for TDD or FDD or both, for a serving cell when a respective condition is met. The respective condition can be that the resource element numbers for carrying ACK/NACK symbols 910 exceeds 4 DFT-S-OFDM symbols on a PUSCH. If the number of resource elements for carrying the ACK/NACK information does not exceed 4 DFT-S-OFDM symbols of allocated PUSCH resource, then legacy ACK/NACK information multiplexing on a PUSCH is performed.

Alternatively, or additionally, embodiments can be realised such that, for a serving cell in FDD-FDD CA system or FDD-TDD CA with FDD as a PUCCH Cell, if a number of transport blocks, such as, for example, two transport blocks, are received on a serving cell, the ACK/NACK information for the serving cell can be generated using a first type of bundling scheme. Embodiments can be realised in which the first type of ACK/NACK bundling scheme can comprise spatially bundling the ACK/NACK information/bits corresponding to the transport blocks. Using such an embodiment, the ACK/NACK information can be reduced from, for example, 64 bits to 32 bits or fewer. In a still further embodiment, for a serving cell with TDD-TDD CA or TDD-FDD CA with TDD as a PCell, a UE can perform a second type of ACK/NACK bundling operation. Embodiments can be realised in which the second type of ACK/NACK bundling comprises (1) generating a predetermined number of ACK/NACK information/bits such as, for example, two ACK/NACK bits, for a serving cell across a predetermined number of downlinks, such as M DL, and subframes associated with a single uplink (UL) subframe for ACK/NACK feedback, denoting the contiguous ACKs from the first actual PDSCH transmission for M>2.

TABLE 1

1$^{st}$ step of Type-2 bundling operation

| HARQ-ACK(0), . . . HARQ-ACK(M-1) | Mapped state |
|---|---|
| ACK, ACK . . . (i.e. M contiguous ACK) | ACK, ACK |
| ACK, (i.e. M-1 contiguous ACK, and M-2 contiguous ACK if M = 4) | NACK/DTX, ACK |
| ACK, NACK/DTX . . . (i.e. 1 contiguous ACK) NACK/DTX, any | ACK, NACK/DTX NACK/DTX, NACK/DTX |

Applying this time-domain bundling, the ACK/NACK information/bit number can be compressed to up to 64 bits.

Embodiments can be realised in which if the RE numbers for the compressed ACK/NACK payload remains larger than 4 DFT-S-OFDM symbols, then the second ACK/NACK bundling scheme is used so that, for example, 1 ACK/NACK bit is generated per serving cell by first performing ACK/NACK bundling across multiple codewords within a DL or a special subframe, followed by bundling across multiple DL and special subframes associated with a single UL subframe for ACK/NACK feedback. Consequently, the compressed ACK/NACK bits number can be further reduced to up to 32 bits eventually.

Figure 11:
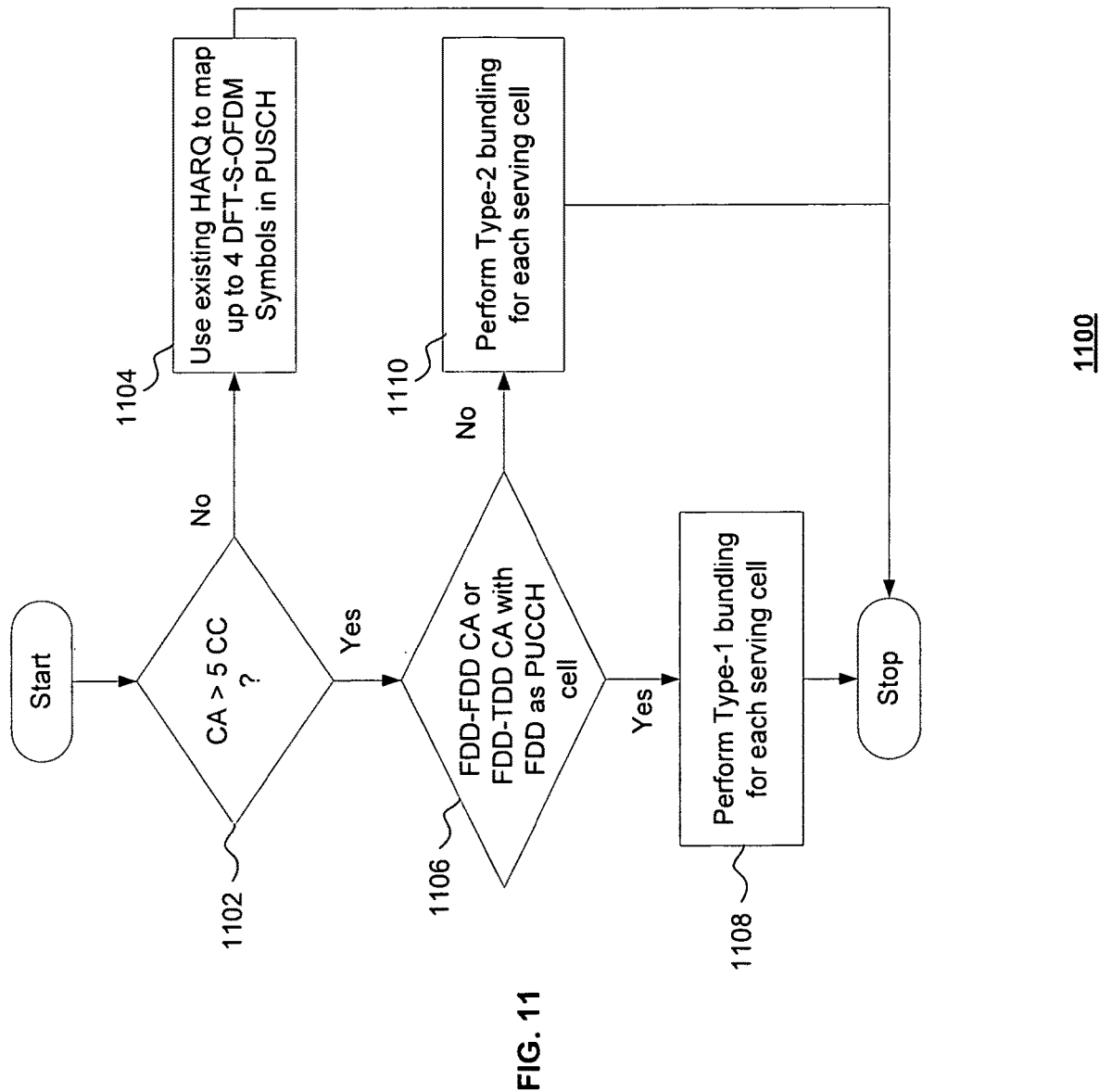
FIG. 11 depicts a flowchart according to embodiments.

Referring to FIG. 11, there is shown a flowchart 1100 of the above process. A determination is made, at 1102, regarding whether or not the number of component carriers being processed by a UE in a carrier aggregation communication is greater than 5. If the determination is negative, legacy ACK/NACK processing is undertaken at 1104, that is, up to 4 DFT-S-OFDM symbols on a PUSCH are used to convey respective ACK/NACK information 910. If the determination, at 1102, is positive, a determination is made, at 1106, regarding whether or not the carrier aggregation comprises FDD-FDD CA or FDD-TDD CA with FDD as a PUCCH cell. If the determination, at 1106, is positive, the first type of ACK/NACK bundling is implemented, at 1108, for each serving cell. If the determination, at 1106, is negative, the second type of ACK/NACK bundling is implemented at 1110 for each serving cell.

Alternatively, or additionally, a variant of the above compression approach is that the UCI information compression, such as, for example, ACK/NACK compression, can be configured by higher layer signalling or dynamically enabled and disabled by means of a DCI message having a respective DCI format. Such an embodiment can be realised via a respective information element rather than depending on whether or not the number of REs for ACK/NACK transmission exceeds 4 DFT-OFDM symbols. Therefore, rather than having the first conditional test at 1102, processing such a message would determine which type of ACK/NACK processing could be undertaken. Embodiments can be realised in which such a configurable ACK/NACK compression can be used for ACK/NACK information multiplexing on PUSCH, which advantageously reduces or avoids downlink throughput loss due to ACK/NACK bundling on the PUCCH.

Referring again to FIG. 1, it can be appreciated that the eNBs 102 and 104 as well as the UE 106 are operable using multiple-input, multiple-output antennas. The UE 106 can operate using single-user MIMO (SU-MIMO), or multi-user MIMO (MU-MIMO). Suitably, embodiments can be realised in which the UE 106, configured for MIMO operation such as, for example, SU-MIMO, assigns resources for UCI feedback such as, ACK/NACK feedback, using multiple layers. Example implementations can dimension resources for such ACK/NACK on PUSCH with SU-MIMO jointly across multiple layers such as, for example, the layers 112, 114, 124, 126 depicted or across some other number of layers. Distributing such UCI information, such as, ACK/NACK information, across multiple layers is comparable to distributing data using multiple layers, that is, the ACK/NACK symbols are multiplexed in multi-layered manner. Embodiments can, therefore, be realised in which ACK/NACK information/symbols are divided amongst a number of layers. Such a division can be equal or otherwise. Alternatively, the ACK/NACK information can be divided amongst layers on the basis of a criterion or criteria. For example, embodiments can be realised in which the ACK/NACK information are divided amongst layers based on modulation and coding schemes such that ACK/NACK information resource elements can be aligned in the time and frequency domains in each DFT-S-OFDM symbol In other example, for a UE configured with uplink carrier aggregation (UL CA), embodiments may extend ACK/NACK symbols to component carriers other than those associated with a PCell and a PUCCH SCell. For example, embodiments can be realised in which configured serving cells are grouped into several cell groups (CG) by RRC signalling or in a predetermined way such that the ACK/NACK or UCI information associated with the component carriers in one CG is carried using a PUSCH scheduled on one component carrier of the CG. For example, the 32 component carriers can be divided into a predetermined number of groups, such as, for example, four CGs, and ACK/NACK symbols on a PUSCH can be performed on the basis of cell groups as per release 10 is performed on a basis of CG like in Rel-10.

In another embodiment, ACK/NACK REs can be mapped to CCs in addition to the PCell and the PUCCH of the, or a, SCell, starting from on a PUSCH of the serving cell with smallest ServCellIndex.

Figure 12:
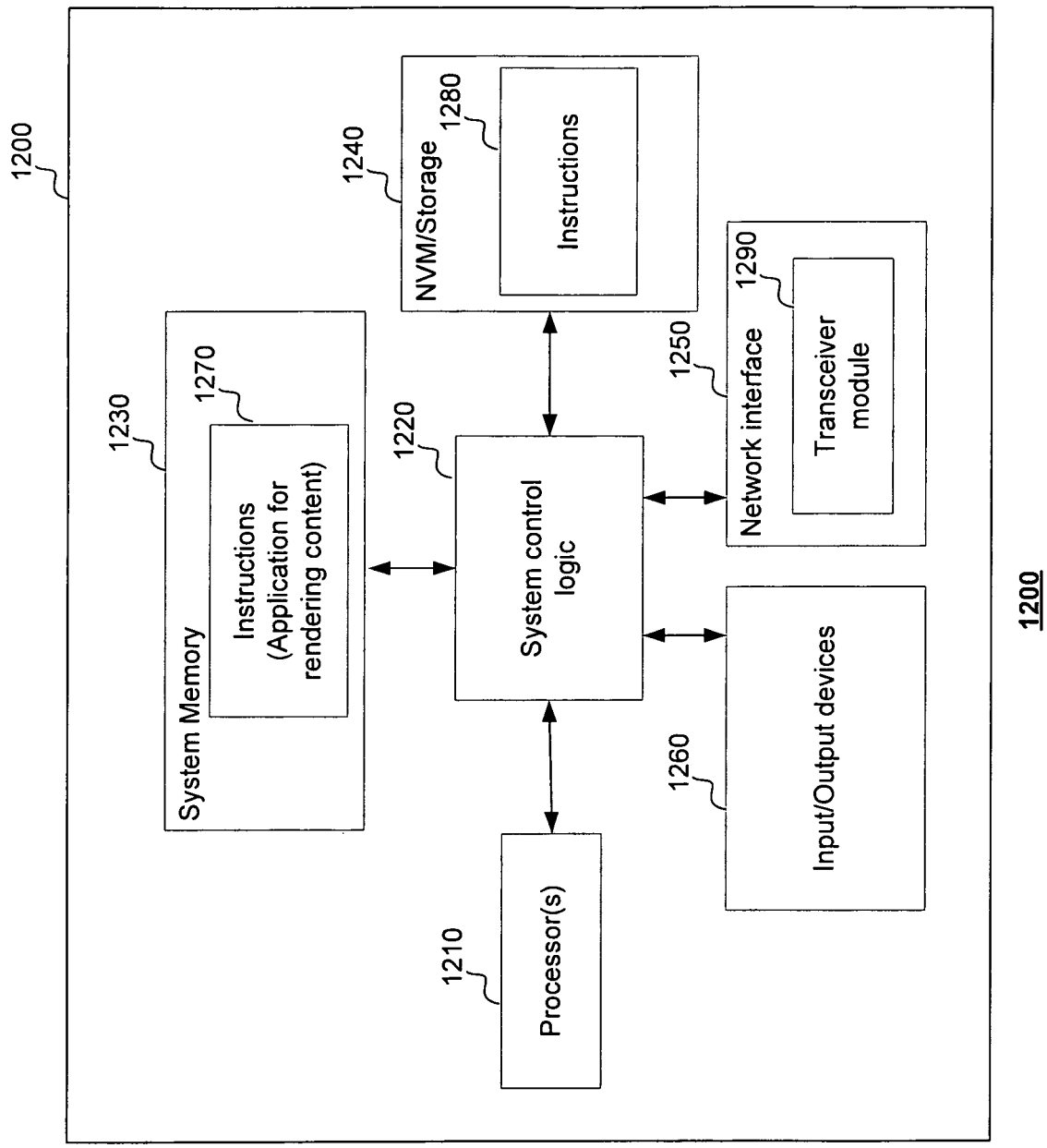
FIG. 12 illustrates a system according to embodiments.

FIG. 12 illustrates, for one embodiment, an example system 1200 for realising an eNB 102/104 and/or a UE 106 as described above with reference to FIGS. 1 and 11 taken jointly and severally. The system 1200 comprises one or more processor(s) 1210, system control logic 1220 coupled with at least one of the processor(s) 1210, system memory 1230 coupled with system control logic 1220, non-volatile memory (NVM)/storage 1240 coupled with system control logic 1220, and a network interface 1250 coupled with system control logic 1220. The system control logic 1220 may also be coupled to Input/Output devices 1260.

Processor(s) 1210 may include one or more single-core or multi-core processors. Processor(s) 1210 may include any combination of general-purpose processors and/or dedicated processors (e.g., graphics processors, application processors, baseband processors, etc.). Processors 1210 may be operable to carry out the above described signal processing using suitable instructions or programs (i.e. to operate via use of processor, or other logic, instructions). The instructions may be stored in system memory 1230, as system memory instructions 1270, or, additionally or alternatively, may be stored in (NVM)/storage 1240, as NVM instructions 1280.

System control logic 1220, for one embodiment, may include any suitable interface controllers to provide for any suitable interface to at least one of the processor(s) 1210 and/or to any suitable device or component in communication with system control logic 1220.

System control logic 1220, for one embodiment, may include one or more memory controller(s) to provide an interface to system memory 1230. System memory 1230 may be used to load and store data and/or instructions for the system 1200. A system memory 1230, for one embodiment, may include any suitable volatile memory, such as suitable dynamic random access memory (DRAM), for example. NVM/storage 1240 may include one or more than one tangible, non-transitory computer-readable medium used to store data and/or instructions, for example. NVM/storage 1240 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1240 may include a storage resource that is physically part of a device on which the system 1200 is installed or it may be accessible by, but not necessarily a part of, the system 1200. For example, the NVM/storage 1240 may be accessed over a network via the network interface 1250.

System memory 1230 and NVM/storage 1240 may respectively include, in particular, temporal and persistent, that is, non-transient, copies of, for example, the instructions 1270 and 1280, respectively. Instructions 1270 and 1280 may include instructions that when executed by at least one of the processor(s) 1210 result in the system 1200 implementing the processing of the method(s) of any embodiment or any other embodiment as described herein. In some embodiments, instructions 1270 and 1280, or hardware, firmware, and/or software components thereof, may additionally/alternatively be located in the system control logic 1220, the network interface 1250, and/or the processor(s) 1210.

Network interface 1250 may have a transceiver 1290 to provide a radio interface for system 1200 to communicate over one or more network(s) (e.g. wireless communication network) and/or with any other suitable device. The transceiver 1290 may implement receiver that performs the above processing of the received signals to realise interference mitigation. In various embodiments, the transceiver 1290 may be integrated with other components of the system 1200. For example, the transceiver 1290 may include a processor of the processor(s) 1210, memory of the system memory 1230, and NVM/Storage of NVM/Storage 1240. Network interface 1250 may include any suitable hardware and/or firmware. Network interface 1250 may be operatively coupled to the antenna, or to one or more than one antenna to provide a Single Input Single Output (SISO) or a MIMO radio interface. Network interface 1250 for one embodiment may include, for example, a network adapter, a wireless network adapter, a telephone modem, and/or a wireless modem.

For one embodiment, at least one of the processor(s) 1210 may be packaged together with logic for one or more controller(s) of the system control logic 1220. For one embodiment, at least one of the processor(s) 1210 may be packaged together with logic for one or more controllers of the system control logic 1220 to form a System in Package (SiP). For one embodiment, at least one of the processor(s) 1240 may be integrated on the same die with logic for one or more controller(s) of the system control logic 1220. For one embodiment, at least one of the processor(s) 1210 may be integrated on the same die with logic for one or more controller(s) of system control logic 1220 to form a System on Chip (SoC).

In various embodiments, the I/O devices 1260 may include user interfaces designed to enable user interaction with the system 1200, peripheral component interfaces designed to enable peripheral component interaction with the system 1200, and/or sensors designed to determine environmental conditions and/or location information related to the system 1200.

Figure 13:
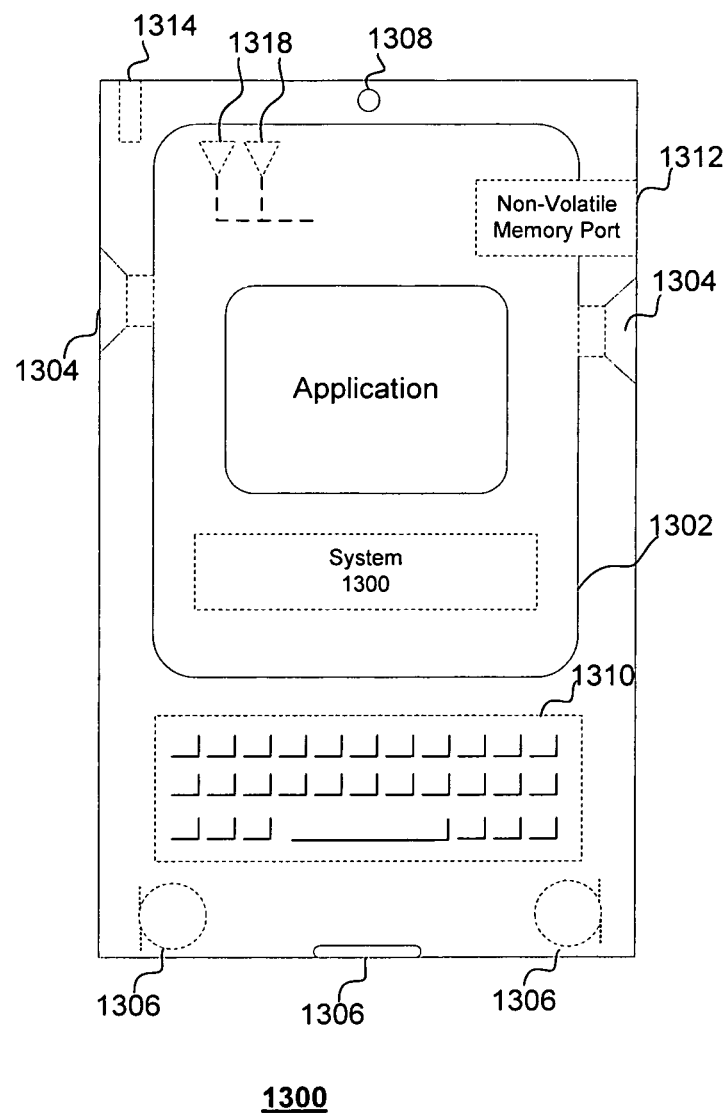
FIG. 13 depicts a user equipment according to embodiments.

FIG. 13 shows an embodiment in which the system 1200 is used to realise a UE such as UE 106. Such a user equipment 106 can be realised in form of a mobile device 1300.

In various embodiments, user interfaces of the mobile device 1300 could include, but are not limited to, a display 1302 (e.g., a liquid crystal display, a touch screen display, etc.), a speaker 1304, a microphone 1306, one or more cameras 1308 (e.g., a still camera and/or a video camera), a flashlight (e.g., a light emitting diode), and a keyboard 1310.

In various embodiments, one or more than one peripheral component interface may be provided including, but not limited to, a non-volatile memory port 1312, an audio jack 1314, and a power supply interface 1316.

In various embodiments, one or more sensors may be provided including, but not limited to, a gyro sensor, an accelerometer, a proximity sensor, an ambient light sensor, and a positioning unit. The positioning unit may also be part of, or interact with, the network interface 1250 to communicate with components of a positioning network, e.g., a global positioning system (GPS) satellite.

In various embodiments, the system 1300 may be a mobile computing device such as, but not limited to, a laptop computing device, a tablet computing device, a netbook, a mobile phone, etc. In various embodiments, the system 1300 may have more or fewer components, and/or different architectures.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 14:
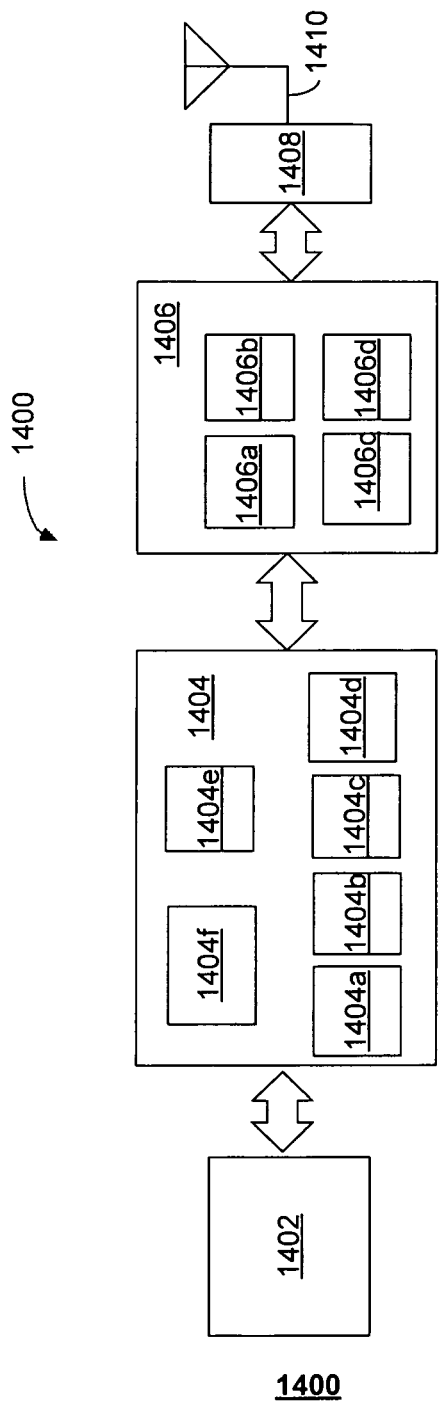
FIG. 14 shows a user equipment according to embodiments.

Embodiments described herein may be implemented into a system using any suitably configured hardware and/or software. FIG. 14 illustrates, for one embodiment, example components of a device 1400, such as, for example, an eNB 102, 104 or UE 106. In some embodiments, the device 1400 may include application circuitry 1402, baseband circuitry 1404, Radio Frequency (RF) circuitry 1406, front-end module (FEM) circuitry 1408 and one or more antennas 1410, coupled together at least as shown.

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1404 may include circuitry such as, but not limited to, one or more single-core or multi-core processors. The baseband circuitry 1404 may include one or more baseband processors and/or control logic to process baseband signals received from a receive signal path of the RF circuitry 1406 and to generate baseband signals for a transmit signal path of the RF circuitry 1406. Baseband processing circuitry 1404 may interface with the application circuitry 1402 for generation and processing of the baseband signals and for controlling operations of the RF circuitry 1406. For example, in some embodiments, the baseband circuitry 1404 may include a second generation (2G) baseband processor 1404a, third generation (3G) baseband processor 1404b, fourth generation (4G) baseband processor 1404c, and/or other baseband processor(s) 1404d for other existing generations, generations in development or to be developed in the future (e.g., fifth generation (5G), 6G, etc.). The baseband circuitry 1404 (e.g., one or more of baseband processors 1404a-d) may handle various radio control functions that enable communication with one or more radio networks via the RF circuitry 1406. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, and/or constellation mapping/demapping functionality. In some embodiments, encoding/decoding circuitry of the baseband circuitry 1404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1404e of the baseband circuitry 1404 may be configured to run elements of the protocol stack for signaling of the PHY, MAC, RLC, PDCP and/or RRC layers. In some embodiments, the baseband circuitry may include one or more audio digital signal processor(s) (DSP) 1404f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 1408 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the RF circuitry 1406 may include a receive signal path and a transmit signal path. The receive signal path of the RF circuitry 1406 may include mixer circuitry 1406a, amplifier circuitry 1406b and filter circuitry 1406c. The transmit signal path of the RF circuitry 1406 may include filter circuitry 1406c and mixer circuitry 1406a. RF circuitry 1406 may also include synthesizer circuitry 1406d for synthesizing a frequency for use by the mixer circuitry 1406a of the receive signal path and the transmit signal path. In some embodiments, the mixer circuitry 1406a of the receive signal path may be configured to down-convert RF signals received from the FEM circuitry 1408 based on the synthesized frequency provided by synthesizer circuitry 1406d. The amplifier circuitry 1406b may be configured to amplify the down-converted signals and the filter circuitry 1406c may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals. In some embodiments, mixer circuitry 1406a of the receive signal path may comprise passive mixers, although the scope of the embodiments is not limited in this respect.

In some embodiments, the mixer circuitry 1406a of the transmit signal path may be configured to up-convert input baseband signals based on the synthesized frequency provided by the synthesizer circuitry 1406d to generate RF output signals for the FEM circuitry 1408. The baseband signals may be provided by the baseband circuitry 1404 and may be filtered by filter circuitry 1406c. The filter circuitry 1406c may include a low-pass filter (LPF), although the scope of the embodiments is not limited in this respect.

In some embodiments, the mixer circuitry 1406a of the receive signal path and the mixer circuitry 1406a of the transmit signal path may include two or more mixers and may be arranged for quadrature down-conversion and/or up-conversion respectively. In some embodiments, the mixer circuitry 1406a of the receive signal path and the mixer circuitry 1406a of the transmit signal path may include two or more mixers and may be arranged for image rejection (e.g., Hartley image rejection). In some embodiments, the mixer circuitry 1406a of the receive signal path and the mixer circuitry 1406a may be arranged for direct down-conversion and/or direct up-conversion, respectively. In some embodiments, the mixer circuitry 1406a of the receive signal path and the mixer circuitry 1406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer comprising a phase-locked loop with a frequency divider.

The synthesizer circuitry 1406d may be configured to synthesize an output frequency for use by the mixer circuitry 1406a of the RF circuitry 1406 based on a frequency input and a divider control input. In some embodiments, the synthesizer circuitry 1406d may be a fractional N/N+1 synthesizer.

In some embodiments, frequency input may be provided by a voltage controlled oscillator (VCO). Divider control input may be provided by either the baseband circuitry 1404 or the applications processor 1402 depending on the desired output frequency. In some embodiments, a divider control input (e.g., N) may be determined from a look-up table based on a channel indicated by the applications processor 1402.

Synthesizer circuitry 1406d of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1406 may include an IQ/polar converter.

FEM circuitry 1408 may include a receive signal path which may include circuitry configured to operate on RF signals received from one or more antennas 1410, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410.

In some embodiments, the UE device 1400 may include additional elements such as, for example, memory/storage, display, camera, sensor, and/or input/output (I/O) interface.

In various embodiments, the UE and/or the eNB may include a plurality of antennas to implement a multiple-input-multiple-output (MIMO) transmission system, which may operate in a variety of MIMO modes, including single-user MIMO (SU-MIMO), multi-user MIMO (MU-MIMO), closed loop MIMO, open loop MIMO or variations of smart antenna processing. The UE may provide some type of channel state information (CSI) feedback to the eNB via one or more up link channels, and the eNB may adjust one or more down link channels based on the received CSI feedback. The feedback accuracy of the CSI may affect the performance of the MIMO system.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

In various embodiments, the UE may transmit CSI feedback to the eNB. The CSI feedback may include information related to channel quality index (CQI), precoding matrix indicator (PMI), and rank indication (RI). PMI may reference, or otherwise uniquely identify, a precoder within the codebook. The eNB may adjust the downlink channel based on the precoder referenced by the PMI.

The components and features of the above eNBs and UEs may be implemented using any combination of discrete circuitry, application specific integrated circuits (ASICs), logic gates and/or single chip architectures. Further, the features of UE may be implemented using microcontrollers, programmable logic arrays and/or microprocessors or any combination of the foregoing where suitably appropriate. It is noted that hardware, firmware and/or software elements may be collectively or individually referred to as "logic" or "circuit".

The various embodiments may be used in a variety of applications including transmitters and receivers of a radio system, although the embodiments are not limited in this respect. Radio systems specifically included within the scope of the embodiments include, but are not limited to, network interface cards (NICs), network adaptors, fixed or mobile client devices, relays, eNodeB or transmit points, femtocells, gateways, bridges, hubs, routers, access points, or other network devices. Further, the radio systems within the scope of the embodiments may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

The embodiments herein have been described within the context of using millimeter wave frequencies or one or more than one millimeter wave frequency band for the unlicensed spectrum or spectra. However, embodiments are not limited to such frequencies. Embodiments can be realised in which other frequencies or frequency bands can be used.

Embodiments described herein show the smaller cells as being overlaid on a macro-cell. However, embodiments are not limited thereto. Any and all embodiments can be realised in which the smaller cells are operable without being overlaid on a macro-cell or any other cell.

It will be appreciated that embodiments can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick or solid state medium. It will be appreciated that the storage devices and storage media are embodiments of non-transitory machine-readable storage that are suitable for storing a program or programs comprising instructions that, when executed, implement embodiments described and claimed herein. Accordingly, embodiments provide machine executable code for implementing a system, apparatus, eNB, UE, device or method as described herein or as claimed herein and machine readable storage storing such a program. Still further, such programs may be conveyed electronically via any medium such as a communication signal carried over a wired or wireless connection and embodiments suitably encompass the same.

Embodiments are also provided according to the following examples:

Example 1 may include a method of wireless communications for performing UTH. HARQ-ACK transmission on PUSCH operations for CA with beyond 5 CCs, comprising: transmitting, by a User Equipment (UE), a vector sequence of hybrid automatic-repeat-request acknowledgement (HARQ-ACK) bits to a first control region when a condition is met.

Example 2 may include the method of example 1 or some other example herein, wherein the condition is met when a predefined state is set in an information element (IE) in higher-layer signaling message or a new DCI format used for UL grant.

Example 3 may include the method of example 1 or some other example herein, wherein the condition is met when the number of resources to transmit total number of HARQ-ACK bits is larger than 4 DFT-S-OFDM symbols within the allocated PUSCH resources.

Example 4 may include the method of example 1 or some other example herein, wherein the condition is met when the number of CCs configured by NW is larger than 5.

Example 5 may include the method of example 1 or some other example herein, wherein the first control region comprise consecutive RB(s) next to PUSCH resources allocated by the detected UL grant.

Example 6 may include the method of example 5 or some other example herein, wherein the location and number of RBs in the first control region is either fixed in specification or configurable through higher layer signaling or a new DCI format used for UL grant.

Example 7 may include the method of example 1 or some other example herein, wherein the first control region comprise a number of symbols sets and the HARQ-ACK bits are mapped to these symbols sets sequentially starting from the set with the smallest set index.

Example 8 may include the method of example 7 or some other example herein, wherein the number of symbols sets in case of normal CP, comprising: Set #0 includes DFT-S-OFDM symbol {#2, #4, #9, #11}; Set #1 includes DFT-S-OFDM symbol {#1, #5, #8, #12}; and Set #1 includes DFT-S-OFDM symbol {#0, #6, #7, #13}.

Example 9 may include the method of example 7 or some other example herein, wherein the number of symbols sets in case of extended CP, comprising: Set #0 includes DFT-S-OFDM symbol {#1, #3, #7, #9}; and/or Set #1 includes DFT-S-OFDM symbol {#0, #4, #6, #10}.

Example 10 may include the method of example 1 or some other example herein, wherein the condition is met when UE is configured with SU-MIMO.

Example 11 may include the method of example 1 or some other example herein, wherein the first region is all layers of both transport blocks and the HARQ-ACK REs are time-domain and frequency-domain aligned in each DFT-S-OFDM symbols.

Example 12 may include the method of example 1 or some other example herein, wherein the condition is met when UE is configured with UL carrier aggregation (CA).

Example 13 may include the method of example 1 or some other example herein, wherein the first region include one or more SCells in addition to PCell and PUCCH SCell.

Example 14 may include the method of example 13 or some other example herein, wherein the HARQ-ACK bits first mapped to PCell or PUCCH SCell, then followed by other SCell with smallest SerCellIndex.

Example 15 may include the method of example 1 or some other example herein, further comprising that the vector sequence of HARQ-ACK bits are compressed based on a predefined rule before mapping to the first region.

Example 16 may include the method of example 15 or some other example herein, wherein the predefined rule for a FDD serving cell in FDD-FDD CA or a TDD serving cell in FDD-TDD CA with FDD serving cell as PUCCH cell comprising: Spatially bundling the HARQ-ACK bits corresponding to the transport blocks.

Example 17 may include the method of example 15 or some other example herein, wherein the predefined rule for a TDD serving cell in TDD-TDD CA or a FDD serving cell in FDD-TDD CA with TDD serving cell as PUCCH cell comprising 2-step procedure: first, generate two HARQ-ACK bits for a serving cell across M DL and special subframes associated with a single UL subframe for HARQ-ACK feedback, denoting the contiguous ACKs from the first actual PDSCH transmission for M>2 case; and secondly, if the RE numbers for the compressed HARQ-ACK payload remains larger than 4 DFT-S-OFDM symbols, then second HARQ-ACK bundling scheme is conducted so that 1 HARQ-ACK bit is generated per serving cell by first performing HARQ-ACK bundling across multiple codewords within a DL or special subframe then followed by bundling across multiple DL and special subframes associated with a single UL subframe for HARQ-ACK feedback.

Example 18 may include a method comprising: identifying, by a user equipment (UE), that a hybrid automatic repeat request acknowledgement (HARQ-ACK) related to a physical uplink shared channel (PUSCH) operation that includes carrier aggregation (CA) is to be transmitted; identifying, by the UE, a first control region; and transmitting, by the UE, a vector sequence of bits of the HARQ-ACK to the first control region related to a condition.

Example 19 may include the method of example 18 or some other example herein, wherein the condition is related to setting of a predefined state is set in an information element (IE) in a higher-layer signaling message.

Example 20 may include the method of example 18 or some other example herein, wherein the condition is related to use of a new downlink control information (DCI) format for uplink (UL) grant.

Example 21 may include the method of example 18 or some other example herein, wherein the condition related to a number of resources to transmit a total number of bits of the HARQ-ACK being larger than 4 discrete Fourier transform spread orthogonal frequency division multiplexing (DFT-S-OFDM) symbols with resources of the PUSCH.

Example 22 may include the method of example 18 or some other example herein, wherein the condition is related to a number of component carriers (CCs) related to the CA being greater than five.

Example 23 may include the method of example 22 or some other example herein, wherein the number of CCs is configured by a network entity that is communicatively coupled with the UE.

Example 24 may include the method of example 18 or some other example herein, wherein the first control region includes one or more consecutive resource blocks (RBs) that are next to PUSCH resources that are allocated by an indication of a uplink (UL) grant.

Example 25 may include the method of example 24 or some other example herein, wherein a location and number of RBs in the first control region is fixed by a third generation partnership project (3GPP) specification or is configurable through higher layer signaling or a new downlink control information (DCI) format related to the UL grant.

Example 26 may include the method of example 18 or some other example herein, wherein the first control region includes one or more symbol sets, and bits of the HARQ-ACK are mapped to the symbol sets sequentially starting from a set with a smallest set index of the one or more symbol sets.

Example 27 may include the method of example 26 or some other example herein, wherein, in case of normal cyclic prefix (CP), the one or more symbol sets are Set #0 which includes DFT-S-OFDM symbol {#2, #4, #9, #11}; Set #1 which includes DFT-S-OFDM symbol {#1, #5, #8, #12}; and/or Set #1 includes DFT-S-OFDM symbol {#0, #6, #7, #13}.

Example 28 may include the method of example 26 or some other example herein, wherein, in case of extended cyclic prefix (CP), the one or more symbol sets are Set #0 which includes DFT-S-OFDM symbol {#1, #3, #7, #9}; and/or Set #1 includes DFT-S-OFDM symbol {#0, #4, #6, #10}.

Example 29 may include the method of example 18 or some other example herein, wherein the condition is related to configuration of the UE with single user multiple input multiple output (SU-MIMO).

Example 30 may include the method of example 18 or some other example herein, wherein the first region includes all layers of both transport blocks and resource elements (REs) related to the HARQ-ACK are time-domain and frequency-domain aligned in respective DFT-S-OFDM symbols of the PUSCH.

Example 31 may include the method of example 18 or some other example herein, wherein the condition is related to configuration of the UE with uplink (UL) CA.

Example 32 may include the method of example 18 or some other example herein, wherein the first region includes one or more secondary cells (SCells) in addition to a primary cell (PCell) and a physical uplink control channel (PUCCH) SCell.

Example 33 may include the method of example 32 or some other example herein, wherein bits of the HARQ-ACK are first mapped to the PCell or PUCCH SCell, then followed by one of the one or more SCells with a smallest SerCellIndex.

Example 34 may include the method of example 18 or some other example herein, further comprising compressing, by the UE, the vector sequence based on a predefined rule before mapping the bits to the first region.

Example 35 may include the method of example 34 or some other example herein, wherein the predefined rule for a frequency division duplex (FDD) serving cell in FDD-FDD CA or a time division duplex (TDD) serving cell in FDD-TDD CA with FDD serving cell as PUCCH cell is: spatially bundling the bits of the HARQ-ACK corresponding to one or more transport blocks.

Example 36 may include the method of example 34 or some other example herein, wherein the predefined rule for a TDD serving cell in TDD-TDD CA or a FDD serving cell in FDD-TDD CA with TDD serving cell as PUCCH cell includes: generating, by the UE, two HARQ-ACK bits for a serving cell across M downlink (DL) and special subframes associated with a single UL subframe for HARQ-ACK feedback, denoting the contiguous ACKs from the first actual PDSCH transmission for M>2 case; and if the RE numbers for the compressed HARQ-ACK payload remains larger than 4 DFT-S-OFDM symbols, then conducting, by the UE, a second HARQ-ACK bundling so that 1 HARQ-ACK bit is generated per serving cell by first performing HARQ-ACK bundling across multiple codewords within a DL or special subframe then followed by bundling across multiple DL and special subframes associated with a single UL subframe for HARQ-ACK feedback.

Example 37 may include a user equipment (UE) comprising: baseband circuitry to identify that a hybrid automatic repeat request acknowledgement (HARQ-ACK) related to a physical uplink shared channel (PUSCH) operation that includes carrier aggregation (CA) is to be transmitted; and radio frequency (RF) circuitry coupled with the baseband circuitry, the RF circuitry to transmit, based on occurrence of a condition, a vector sequence of bits of the HARQ-ACK to a first control region.

Example 38 may include the UE of example 37 or some other example herein, wherein the condition is related to setting of a predefined state is set in an information element (IE) in a higher-layer signaling message.

Example 39 may include the UE of example 37 or some other example herein, wherein the condition is related to use of a new downlink control information (DCI) format for uplink (UL) grant.

Example 40 may include the UE of example 37 or some other example herein, wherein the condition related to a number of resources to transmit a total number of bits of the HARQ-ACK being larger than 4 discrete Fourier transform spread orthogonal frequency division multiplexing (DFT-S-OFDM) symbols with resources of the PUSCH.

Example 41 may include the UE of example 37 or some other example herein, wherein the condition is related to a number of component carriers (CCs) related to the CA being greater than five.

Example 42 may include the UE of example 41 or some other example herein, wherein the number of CCs is configured by a network entity that is communicatively coupled with the UE.

Example 43 may include the UE of example 37 or some other example herein, wherein the first control region includes one or more consecutive resource blocks (RBs) that are next to PUSCH resources that are allocated by an indication of a uplink (UL) grant.

Example 44 may include the UE of example 43 or some other example herein, wherein a location and number of RBs in the first control region is fixed by a third generation partnership project (3GPP) specification or is configurable through higher layer signaling or a new downlink control information (DCI) format related to the UL grant.

Example 45 may include the UE of example 37 or some other example herein, wherein the first control region includes one or more symbol sets, and bits of the HARQ-ACK are mapped to the symbol sets sequentially starting from a set with a smallest set index of the one or more symbol sets.

Example 46 may include the UE of example 45 or some other example herein, wherein, in case of normal cyclic prefix (CP), the one or more symbol sets are Set #0 which includes DFT-S-OFDM symbol {#2, #4, #9, #11}; Set #1 which includes DFT-S-OFDM symbol {#1, #5, #8, #12}; and/or Set #1 includes DFT-S-OFDM symbol {#0, #6, #7, #13}.

Example 47 may include the UE of example 45 or some other example herein, wherein, in case of extended cyclic prefix (CP), the one or more symbol sets are Set #0 which includes DFT-S-OFDM symbol {#1, #3, #7, #9}; and/or Set #1 includes DFT-S-OFDM symbol {#0, #4, #6, #10}.

Example 48 may include the UE of example 37 or some other example herein, wherein the condition is related to configuration of the UE with single user multiple input multiple output (SU-MIMO).

Example 49 may include the UE of example 37 or some other example herein, wherein the first region includes all layers of both transport blocks and resource elements (REs) related to the HARQ-ACK are time-domain and frequency-domain aligned in respective DFT-S-OFDM symbols of the PUSCH.

Example 50 may include the UE of example 37 or some other example herein, wherein the condition is related to configuration of the UE with uplink (UL) CA.

Example 51 may include the UE of example 37 or some other example herein, wherein the first region includes one or more secondary cells (SCells) in addition to a primary cell (PCell) and a physical uplink control channel (PUCCH) SCell.

Example 52 may include the UE of example 51 or some other example herein, wherein bits of the HARQ-ACK are first mapped to the PCell or PUCCH SCell, then followed by one of the one or more SCells with a smallest SerCellIndex.

Example 53 may include the UE of example 37 or some other example herein, wherein the baseband circuitry is further to compress the vector sequence based on a predefined rule before mapping the bits to the first region.

Example 54 may include the UE of example 53 or some other example herein, wherein the predefined rule for a frequency division duplex (FDD) serving cell in FDD-FDD CA or a time division duplex (TDD) serving cell in FDD-TDD CA with FDD serving cell as PUCCH cell is: spatially bundling the bits of the HARQ-ACK corresponding to one or more transport blocks.

Example 55 may include the UE of example 53 or some other example herein, wherein the predefined rule for a TDD serving cell in TDD-TDD CA or a FDD serving cell in FDD-TDD CA with TDD serving cell as PUCCH cell includes: generation of two HARQ-ACK bits for a serving cell across M downlink (DL) and special subframes associated with a single UL subframe for HARQ-ACK feedback, denoting the contiguous ACKs from the first actual PDSCH transmission for M>2 case; and if the RE numbers for the compressed HARQ-ACK payload remains larger than 4 DFT-S-OFDM symbols, then conduction of a second HARQ-ACK bundling so that 1 HARQ-ACK bit is generated per serving cell by first performing HARQ-ACK bundling across multiple codewords within a DL or special subframe then followed by bundling across multiple DL and special subframes associated with a single UL subframe for HARQ-ACK feedback.

Example 56 may include an apparatus comprising means to perform one or more elements of a method described in or related to any of examples 1-55, or any other method or process described herein.

Example 57 may include one or more non-transitory computer-readable media comprising instructions to cause an electronic device, upon execution of the instructions by one or more processors of the electronic device, to perform one or more elements of a method described in or related to any of examples 1-55, or any other method or process described herein.

Example 58 may include an apparatus comprising logic, modules, and/or circuitry to perform one or more elements of a method described in or related to any of examples 1-55, or any other method or process described herein.

Example 59 may include a method of communicating in a wireless network as shown and described herein.

Example 60 may include a system for providing wireless communication as shown and described herein.

Example 61 may include a device for providing wireless communication as shown and described herein.

Example 62. A method of wireless communication; the method comprising determining at least a first resource block for transmitting a physical uplink shared channel (PUSCH);

receiving signalling indicating an Acknowledgement/Negative Acknowledgement (ACK/NACK) resource mapping mode on the PUSCH;

determining resource elements for transmitting ACK/NACK information based, at least in part, on the first resource block for transmitting the PUSCH and the received ACK/NACK resource mapping mode on the PUSCH; and transmitting the ACK/NACK information on the determined resource elements.

Example 63. The method of example 62, wherein said signalling indicating the ACK/NACK resource mapping mode is associated with a dedicated Radio Resource Control (RRC) message.

Example 64. The method of example 62, wherein said signalling indicating the ACK/NACK resource mapping mode is associated with an information field (IE) of a Downlink Control Information (DCI) message.

Example 65. The method of example 62, where said determining resource elements for transmitting the ACK/NACK information based, at least in part, on the first resource block for transmitting the PUSCH and the received ACK/NACK resource mapping mode on PUSCH further comprises:

transmitting the ACK/NACK information on the resource elements within four symbols adjacent to an Uplink Reference Signal (UL RS) having an upper bound of 4 DFT-S-OFDM symbols within the PUSCH in the first resource block for transmitting the PUSCH, if the ACK/NACK resource mapping mode corresponds to a first ACK/NACK resource mapping mode on the PUSCH; and transmitting the ACK/NACK information on the resource elements within one or more than one prescribed resource block that is adjacent, in the frequency domain, to the first resource block for transmitting the PUSCH if the ACK/NACK resource mapping mode on the PUSCH corresponds to a second ACK/NACK resource mode mapping on the PUSCH.

Example 66. The method of example 65, wherein said resource elements for transmitting the ACK/NACK information within one or more than one prescribed resource block that is adjacent, in the frequency domain, to the first resource block for transmitting the PUSCH is associated with a predetermined Physical Resource Block (PRB) of the at least a first resource block for transmitting the PUSCH.

Example 67. The method of example 66, wherein the predetermined PRB is a PRB adjacent to the highest PRB associated with PUSCH data of the PUSCH.

Example 68. The method of example 66, wherein the predetermined PRB is a PRB adjacent to the lowest PRB associated with the PUSCH data of the PUSCH.

Example 69. The method of example 65, wherein the ACK/NACK resource mapping mode on the PUSCH comprises reporting ACK/NACK using resource elements of said resource block other than the first resource block for transmitting the PUSCH.

Example 70. The method of any preceding example, where determining the resource elements for transmitting the ACK/NACK information comprises receiving a message comprising information indicating prescribed resource elements for transmitting the ACK/NACK information.

Example 71. The method of example 62, wherein said determining resource elements for transmitting the ACK/NACK information comprises determining fixed resource elements for carrying the ACK/NACK information or determining dynamically allocated resource elements for transmitting the ACK/NACK information.

Example 72. The method of any preceding example, wherein said determining resource elements for transmitting the ACK/NACK information comprises allocating resource elements having a predetermined disposition, such as adjacent, relative to the first resource block for transmitting the PUSCH for simultaneous uplink transmission using a common or single Discrete Fourier Transform (DFT).

Example 73. The method of any preceding example, comprising determining the number of component carriers associated with received signals and wherein said determining resource elements for transmitting the ACK/NACK information in the adjacent resource block is responsive to the number of component carriers comprising more than 5 component carriers.

Example 74. The method of any preceding example, comprising (this needed changing because it was eNB activity before)

receiving a DCI message comprising an information field (IE) indicating that an adjacent resource block is available for transmitting the ACK/NACK information; and processing the DCI message within a user equipment specific search space given by a respective identifier, such as, a user equipment identifier, optionally by a Cell Radio Network Temporary Identity (C-RNTI).

Example 75. The method of any preceding example, in which the ACK/NACK information comprises additional UCI information comprises at least one of ACK/NACK information, Channel Quality Indicator (CQI), Precoding Matrix Indicator (PMI) or Rank Indicator (RI) taken jointly and severally in any and all permutations.

Example 76. The method of example 75, comprising mapping to respective regions of associated resource blocks the at least one of ACK/NACK information, CQI, PMI and RI.

Example 77. The method of either of examples 75 and 76, comprising mapping said at least one of the CQI, PMI or RI onto resource elements of a PUSCH allocated to a user equipment and mapping the ACK/NACK information to prescribed resource element or resource elements of an adjacent or prescribed resource block.

Example 78. The method of any preceding example, comprising coding the ACK/NACK information using a predetermined coding scheme.

Example 79. The method of example 78, in which coding the ACK/NACK information using a predetermined coding comprises coding the ACK/NACK information using first tail biting convolutional coding.

Example 80. The method of either of examples 78 and 79, in which said coding is at a predetermined code rate, optionally, the predetermined code rate is 1/3.

Example 81. The method of any of examples 78 to 80, comprising rate matching the coded ACK/NACK information to fit into one RB using a predetermined modulation scheme, optionally, QPSK.

Example 82. A method of transmitting uplink control information (UCI) on a PUSCH, the method comprising determining a first resource element (RE) region for transmitting a first type of UCI information comprising ACK/NACK information;

determining a second RE region reserved for transmitting a second type of UCI information; and transmitting the ACK/NACK information using resource elements of second RE region when the first RE region is insufficient to transmit the ACK/NACK information.

Example 83. The method of example 82, comprising determining that the first resource element region for transmitting ACK/NACK information has reached a predetermined limit for transmitting UCI information.

Example 84. The method of either of examples 82 and 83, in which the first RE region is responsive to a set of RE vectors prescribing an order of allocating resource elements within the first or second resource element region for transmitting ACK/NACK information.

Example 85. The method of any of examples 83 to 85, in which said second type of UCI information comprises at least one of Rank Indicator (RI), Channel Quality Indicator (CQI) or Precoding Matrix Indicator (PMI) information.

Example 86. The method of example 84, in which the set of RE vectors prescribing an order of allocating resource elements within the first or second RE region for transmitting the ACK/NACK information is arranged to prescribe an order of mapping ACK/NACK information starting from a last row of reserved resource elements moving forward in a time-first mapping.

Example 87. The method of example 86, where said starting from a last row of resource elements moving forward in a time-first mapping comprises using resource elements of multiple time slots of a subframe.

Example 88. The method of example 84, in which the set of RE vectors prescribing an order of allocating resource elements of the first or second resource element region for transmitting ACK/NACK information is arranged to prescribe an order of allocating starting from a first row of resource elements moving downwards in a time-first mapping comprises using resource elements of multiple time slots of a subframe.

Example 89. The method of example 84, in which the set of RE vectors prescribing an order of allocating resource elements comprises REs in one or more than one symbol set prescribing a symbol order to be used to transmit the ACK/NACK information.

Example 90. The method of example 89, in which the one or more than one symbol set comprises a plurality of symbol sets prescribing respective symbol orders in which resource elements of associated symbols are used to transmit the ACK/NACK information.

Example 91. The method of any of examples 89 to 90, in which, in response to a normal cyclic prefix, the one or more than one symbol set comprises at least one of: Set #0 comprising DFT-S-OFDM symbols {#2, #4, #9, #11}; Set #1 comprising DFT-S-OFDM symbols {#1, #5, #8, #12}; or Set #2 comprising DFT-S-OFDM symbols {#0, #6, #7, #13}.

Example 92. The method of either of examples 89 and 90, in which, in response to an extended cyclic prefix (CP), the one or more than one symbol set comprises at least one of:
Set #0 comprising DFT-S-OFDM symbols {#1, #3, #7, #9}; or
Set #1 comprising DFT-S-OFDM symbols {#0, #4, #6, #10}.

Example 93. The method of example 90, in which the plurality of symbol sets are arranged to influence or preserve alignment between a Network (NW) and a User Equipment (UE).

Example 94. A method of communicating Uplink Control Information (UCI) comprising Acknowledgement/Negative Acknowledgement (ACK/NACK) information; the method comprising:
determining whether or not a number of resource elements for ACK/NACK information transmission exceeds a predetermined number of prescribed symbols; and
performing ACK/NACK bundling when the number of resource elements for ACK/NACK information transmission exceeds the predetermined number of prescribed symbols and ACK/NACK information transmission is associated with one or more than one PUSCH; and
transmitting the ACK/NACK information on PUSCH resource elements of the prescribed symbols.

Example 95. The method of example 94, wherein said UCI information comprises at least one of Rank Indicator (RI), Channel Quality Indicator (CQI) or Precoding Matrix Indicator (PMI) information.

eNB Side Examples

Example 96. A method of wireless communication; the method comprising
determining at least a first resource block for transmitting a physical uplink shared channel (PUSCH); and
signalling an indication of an Acknowledgement/Negative Acknowledgement (ACK/NACK) resource mapping mode on the PUSCH; said indication comprising resource elements for transmitting ACK/NACK information based, at least in part, on the first resource block for transmitting the PUSCH and a predetermined ACK/NACK resource mapping mode on the PUSCH.

Example 97. The method of example 96, wherein said signalling an indication of an ACK/NACK resource mapping mode is associated with a dedicated Radio Resource Control (RRC) message.

Example 98. The method of either of examples 96 and 97, wherein said signalling an indication of an ACK/NACK resource mapping mode is associated with an information field (IE) of a Downlink Control Information (DCI) message; the method comprising transmitting the DCI message to a user equipment (UE).

Example 99. The method of any of examples 96 to 98, where said signalling an indication of an Acknowledgement/Negative Acknowledgement (ACK/NACK) resource mapping mode on the PUSCH is response to a number of component carries associated with the wireless communication.

Example 100. The method of any of examples 96 to 98, where said signalling an indication of an Acknowledgement/Negative Acknowledgement (ACK/NACK) resource mapping mode on the PUSCH comprises transmitting a message comprising information indicating prescribed resource elements for transmitting the ACK/NACK information.

Example 101. Machine executable instructions arranged, when executed by logic or processing circuitry, to implement a method of any preceding example.

Example 102. Machine readable storage storing machine executable instructions of example 40.

Example 103. An apparatus, system, component, chip, logic, circuitry or device comprising means to implement a method, or any part thereof, of any of examples 62 to 100.

Example 104. A user equipment comprising an apparatus, system, component, chip, logic, circuitry or device of example 103.

Apparatus Examples

Example 105. A user equipment for wireless communication; the user equipment comprising logic to:
allocate a first resource for transmitting a physical uplink shared channel (PUSCH);
process received signalling comprising an indication of an Acknowledgement/Negative Acknowledgement (ACK/NACK) resource mapping mode on the PUSCH;
determine resource elements for transmitting ACK/NACK information based, at least in part, on the first resource block for transmitting the PUSCH and the received ACK/NACK resource mapping mode on the PUSCH; and
output the ACK/NACK information on the determined resource elements.

Example 106. The user equipment of example 105, wherein said logic to process received signalling comprising an indication of an ACK/NACK resource mapping mode on the PUSCH is associated with a Radio Resource Control (RRC) message.

Example 107. The user equipment of either of examples 105 and 106, wherein said logic to process received signalling comprising an indication the ACK/NACK resource mapping mode is associated with an information field (IE) of a Downlink Control Information (DCI) message.

Example 108. The user equipment of any of examples 105 to 107, where said logic to determine resource elements for transmitting the ACK/NACK information based, at least in part, on the first resource block for transmitting the PUSCH and the received ACK/NACK resource mapping mode on the PUSCH further comprises logic or circuitry to:

transmit the ACK/NACK information on the resource elements within four symbols adjacent to an Uplink Reference Signal (UL RS) having an upper bound of 4 DFT-S-OFDM symbols within the PUSCH in the first resource for transmitting the PUSCH, if the ACK/NACK resource mapping mode corresponds to a first ACK/NACK resource mapping mode on the PUSCH; and transmit the ACK/NACK information on the resource elements within one or more than one prescribed resources that are adjacent, in the frequency domain, to the first resource for transmitting the PUSCH if the ACK/NACK resource mapping mode on the PUSCH corresponds to a second ACK/NACK resource mode mapping on the PUSCH.

Example 109. The user equipment of example 108, wherein said resource elements to transmit the ACK/NACK information within one or more than one prescribed resource that is adjacent, in the frequency domain, to the first resource to transmit the PUSCH is associated with a predetermined Physical Resource Block (PRB) of the first resource for transmitting the PUSCH.

Example 110. The user equipment of example 109, wherein the predetermined PRB is a PRB adjacent to the highest PRB associated with PUSCH data of the PUSCH.

Example 111. The user equipment of example 109, wherein the predetermined PRB is a PRB adjacent to the lowest PRB associated with the PUSCH data of the PUSCH.

Example 112. The user equipment of any of examples 108 to 111, comprising logic to report ACK/NACK using resource elements of said resources other than the first resource to transmit the PUSCH.

Example 113. The user equipment of any of example 105 to 112, where the logic to determine the resource elements to transmit the ACK/NACK information comprises logic to receive a message comprising information indicating prescribed resource elements for transmitting the ACK/NACK information.

Example 114. The user equipment of any of examples 105 to 113, wherein the logic to determine resource elements for transmitting the ACK/NACK information comprises logic to determine fixed resource elements for carrying the ACK/NACK information or determine dynamically allocated resource elements for transmitting the ACK/NACK information.

Example 115. The user equipment of any of examples 105 to 114, wherein the logic to determine resource elements for transmitting the ACK/NACK information comprises logic to allocate resource elements having a predetermined disposition, such as adjacent, relative to the first resource to transmit the PUSCH for simultaneous uplink transmission using a common or single Discrete Fourier Transform (DFT).

Example 116. The user equipment of any of examples 105 to 115, comprising logic to determine the number of component carriers associated with received signals and wherein the logic to allocate resource elements to transmit the ACK/NACK information having said predetermined disposition, such as adjacent, relative to the first resource is responsive to the number of component carriers comprising more than 5 component carriers.

Example 117. The user equipment of any of examples 105 to 116, comprising logic to:

receive a DCI message comprising an information field (IE) indicating that an adjacent resource block is available for transmitting the ACK/NACK information; and process the DCI message within a user equipment specific search space given by a respective identifier, such as, a user equipment identifier, optionally by a Cell Radio Network Temporary Identity (C-RNTI).

Example 118. The user equipment of any examples 105 to 117, in which the ACK/NACK information additionally comprises UCI information comprising at least one of ACK/NACK information, Channel Quality Indicator (CQI), Precoding Matrix Indicator (PMI) or Rank Indicator (RI) taken jointly and severally in any and all permutations.

Example 119. The user equipment of example 118, comprising logic to: map to respective regions of associated resource blocks the at least one of ACK/NACK information, CQI, PMI and RI.

Example 120. The user equipment of either of examples 118 and 119, comprising logic to: map said at least one of the CQI, PMI or RI onto resource elements of a PUSCH allocated to a user equipment and mapping the ACK/NACK information to prescribed resource element or resource elements of an adjacent or prescribed resource block.

Example 121. The user equipment of any of examples 105 to 120, comprising logic to: code the ACK/NACK information using a predetermined coding scheme.

Example 122. The user equipment of example 121, in which the logic to: code the ACK/NACK information using a predetermined coding comprises logic to code the ACK/NACK information using first tail biting convolutional coding.

Example 123. The user equipment of either of examples 121 and 122, in which said logic to code comprises logic to code at a predetermined code rate, optionally, the predetermined code rate is 1/3.

Example 124. The user equipment of any of examples 121 to 123, comprising logic to rate match the coded ACK/NACK information to fit into one RB using a predetermined modulation scheme, optionally, QPSK.

Example 125. An apparatus to transmit uplink control information (UCI) on a PUSCH, the apparatus comprising circuitry to:

determine a first resource element (RE) region for transmitting a first type of UCI information comprising ACK/NACK information;

determine a second RE region reserved for transmitting a second type of UCI information; and transmit the ACK/NACK information using resource elements of second RE region when the first RE region is insufficient to transmit the ACK/NACK information.

Example 126. The apparatus of example 125, comprising circuitry to determine that the first resource element region for transmitting ACK/NACK information has reached a predetermined limit for transmitting UCI information.

Example 127. The apparatus of either of examples 125 and 126, in which the first RE region is responsive to a set of RE vectors prescribing an order of allocating resource elements within the first or second resource element region for transmitting ACK/NACK information.

Example 128. The apparatus of any of examples 126 to 127, in which said second type of UCI information comprises at least one of Rank Indicator (RI), Channel Quality Indicator (CQI) or Precoding Matrix Indicator (PMI) information.

Example 129. The apparatus of example 127, in which the set of RE vectors prescribing an order of allocating resource elements within the first or second RE region for transmitting the ACK/NACK information is arranged to prescribe an order of mapping ACK/NACK information starting from a last row of reserved resource elements moving forward in a time-first mapping.

Example 130. The apparatus of example 129, where said starting from a last row of resource elements moving forward in a time-first mapping comprises using resource elements of multiple time slots of a subframe.

Example 131. The apparatus of example 127, in which the set of RE vectors prescribing an order of allocating resource elements of the first or second resource element region for transmitting ACK/NACK information is arranged to prescribe an order of allocating starting from a first row of resource elements moving downwards in a time-first mapping comprises using resource elements of multiple time slots of a subframe.

Example 132. The apparatus of example 127, in which the set of RE vectors prescribing an order of allocating resource elements comprises REs in one or more than one symbol set prescribing a symbol order to be used to transmit the ACK/NACK information.

Example 133. The apparatus of example 132, in which the one or more than one symbol set comprises a plurality of symbol sets prescribing respective symbol orders in which resource elements of associated symbols are used to transmit the ACK/NACK information.

Example 134. The apparatus of any of examples 132 to 133, in which, in response to a normal cyclic prefix, the one or more than one symbol set comprises at least one of:
Set #0 comprising DFT-S-OFDM symbols {#2, #4, #9, #11}; Set #1 comprising DFT-S-OFDM symbols {#1, #5, #8, #12}; or Set #2 comprising DFT-S-OFDM symbols {#0, #6, #7, #13}.

Example 135. The apparatus of either of examples 132 and 133, in which, in response to an extended cyclic prefix (CP), the one or more than one symbol set comprises at least one of:
Set #0 comprising DFT-S-OFDM symbols {#1, #3, #7, #9}; or
Set #1 comprising DFT-S-OFDM symbols {#0, #4, #6, #10}.

Example 136. The apparatus of example 133, in which the plurality of symbol sets are arranged to influence or preserve alignment between a Network (NW) and a User Equipment (UE).

Example 137. A device for processing Uplink Control Information (UCI) comprising Acknowledgement/Negative Acknowledgement (ACK/NACK) information; the device comprising circuitry to:
determine whether or not a number of resource elements for ACK/NACK information transmission exceeds a predetermined number of prescribed symbols; perform ACK/NACK bundling when the number of resource elements for ACK/NACK information transmission exceeds the predetermined number of prescribed symbols and ACK/NACK information transmission is associated with one or more than one PUSCH; and
transmit the ACK/NACK information on PUSCH resource elements of the prescribed symbols.

Example 138. The device of example 137, wherein said UCI information comprises at least one of Rank Indicator (RI), Channel Quality Indicator (CQI) or Precoding Matrix Indicator (PMI) information.

Enb Side Examples

Example 139. An eNodeB for wireless communication; the eNodeB comprising
determining at least a first resource block for transmitting a physical uplink shared channel (PUSCH); and
signalling an indication of an Acknowledgement/Negative Acknowledgement (ACK/NACK) resource mapping mode on the PUSCH; said indication comprising resource elements for transmitting ACK/NACK information based, at least in part, on the first resource block for transmitting the PUSCH and a predetermined ACK/NACK resource mapping mode on the PUSCH.

Example 140. The eNodeB of example 139, wherein said signalling an indication of an ACK/NACK resource mapping mode is associated with a dedicated Radio Resource Control (RRC) message.

Example 141. The eNodeB of either of examples 139 and 140, wherein said signalling an indication of an ACK/NACK resource mapping mode is associated with an information field (IE) of a Downlink Control Information (DCI) message; the method comprising transmitting the DCI message to a user equipment (UE).

Example 142. The eNodeB of any of examples 139 to 141, where said signalling an indication of an Acknowledgement/Negative Acknowledgement (ACK/NACK) resource mapping mode on the PUSCH is response to a number of component carries associated with the wireless communication.

Example 143. The eNodeB of any of examples 139 to 142, where said signalling an indication of an Acknowledgement/Negative Acknowledgement (ACK/NACK) resource mapping mode on the PUSCH comprises transmitting a message comprising information indicating prescribed resource elements for transmitting the ACK/NACK information.

Example 144. A device for uplink acknowledgement/negative acknowledgement (ACK/NACK) information on a physical uplink shared channel; the device comprising circuitry to:
process a plurality of component carriers of aggregated carriers; and
output, in response to plurality of component carriers, ACK/NACK information using resources associated with a selectable resource mapping chosen from a plurality of resource mappings for bearing the ACK/NACK information;
the plurality of resource mappings comprising
an initial resource mapping associated with the plurality of component carriers meeting an initial condition of the plurality of component carriers, and
a further resource mapping associated with the plurality of component carriers meeting a further condition of the plurality of component carriers.

Example 145. The device of example 144, wherein the initial condition comprises the total number of component carriers being five or less component carriers.

Example 146. The device of example 144, wherein the further condition comprises the total number of component carriers being more than five component carriers.

Example 147. The device of any of examples 144 to 146, wherein the initial resource mapping comprises resource elements to be multiplexed onto the PUSCH.

Example 148. The device of any of examples 144 to 146, wherein the further resource mapping comprises resource elements associated with a predetermined resource block having a predetermined disposition relative to resource elements of the initial resource mapping.

Example 149. The device of example 148, wherein the resource elements associated with a predetermined resource block having a predetermined disposition relative to resource elements of the initial resource mapping comprise resource elements associated with at least one adjacent resource block.

Example 150. The device of example 149, wherein the at least one adjacent resource block comprises resource elements higher or lower in the frequency domain relative to the resource elements associated with the initial resource mapping.

Example 151. The device of any of examples 144 to 150, wherein the further resource mapping comprises resource elements associated with uplink control information other than ACK/NACK information and the device comprises circuitry to: assign said resource elements associated with uplink control information other than ACK/NACK information for use with ACK/NACK information.

Example 152. The device of example 151, wherein the circuitry to: assign said resource elements associated with uplink control information other than ACK/NACK information for use with ACK/NACK information comprises circuitry to so assign said resource elements associated with uplink control information other than ACK/NACK information for use with ACK/NACK information in response to at least one resource element pattern or vector.

Example 153. The device of example 152, wherein the at least one resource element pattern or vector is responsive to a type of cyclic prefix.

Example 154. The device of either of examples 152 and 153, wherein said at least one resource element pattern or vector comprises, in response to a normal cyclic prefix, the one or more symbol sets selectable from a plurality of symbol sets.

Example 155. The device of example 154, wherein the plurality of symbol sets comprise:

Set #0 comprising DFT-S-OFDM symbol positions {#2, #4, #9, #11};

Set #1 comprising DFT-S-OFDM symbol positions {#1, #5, #8, #12}; and/or

Set #2 comprising DFT-S-OFDM symbol positions {#0, #6, #7, #13}.

Example 156. The device of either of examples 152 and 153, wherein said at least one resource element pattern or vector comprises, in response to an extended cyclic prefix, the one or more symbol sets selectable from a plurality of symbol sets.

Example 157. The device of example 156, wherein the plurality of symbol sets comprises:

Set #0 comprising DFT-S-OFDM symbol position {#1, #3, #7, #9}; and/or

Set #1 comprising DFT-S-OFDM symbol positions {#0, #4, #6, #10}.

Example 158. An eNodeB, user equipment, apparatus, system, component, chip, logic, circuitry or device substantially as described herein with reference to and/or as illustrated in any one or more than one of the accompanying drawings taken jointly and severally in any and all permutations.

Example 159. A device for a user equipment for supporting wireless communication using a plurality of aggregated carriers; the device comprising circuitry to: process received data associated with the plurality of aggregated carriers; and generate a vector sequence of hybrid automatic-repeat-request acknowledgement data associated with a number of resource elements in response a respective condition.

Example 160. The device of example 159, further comprising a transmitter to output one or more than one signal associated with the vector sequence.

Example 161. The device of any of examples 159 to 160, wherein the respective condition comprises a predefined state associated with an information element (IE) in at least one of a predetermined layer signalling message or a downlink control information (DCI) message.

Example 162. The device of example 161, wherein the downlink control information message is associated with an uplink grant for the user equipment.

Example 163. The device of any of examples 159 to 162, wherein the respective condition is associated with a predetermined number of resources to transmit the hybrid automatic-repeat-request acknowledgement data exceeding a respective threshold.

Example 164. The device of example 163, wherein the respective threshold is 4 DFT-S-OFDM symbols within allocated physical uplink shared channel resources.

Example 165. The device of any of examples 159 to 164, wherein the respective condition is associated with the plurality of carriers exceeding five component carriers.

Example 165. An eNB, UE, device, apparatus or system as described or claimed herein, and/or as expressed in any and all examples, further comprising at least one of:

a display, such as, for example, a touch sensitive display, an input device, such as, for example, one or more than one of a button, a key pad, an audio input, a video input, and/or an output device such as, for example, an audio output, a video output, a haptic device taken jointly and severally in any and all permutations.

As used in this specification, the formulation "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order.

It will be understood that the terms "receiving" and "transmitting" encompass "inputting" and "outputting" and are not limited to an RF context of transmitting and receiving radio waves. Therefore, for example, a chip or other device or component for realizing embodiments could generate data for output to another chip, device or component, or have as an input data from another chip, device or component, and such an output or input could be referred to as "transmit" and "receive" including gerund forms, that is, "transmitting" and "receiving", as well as such "transmitting" and "receiving" having an RF context.

The foregoing description of one or more implementations provides illustration and description, but is not intended to be exhaustive or to limit the scope of the embodiments to the precise form disclosed. Modifications and variations are possible in light of the above teachings or may be acquired from practice of various implementations of the embodiments.

The invention claimed is:

1. One or more non-transitory, computer-readable media having instructions that, when executed by one or more processors, cause a user equipment (UE) to:
- allocate a first resource block for transmitting a Physical Uplink Shared Channel (PUSCH);
- process received signalling that includes an indication of an Acknowledgement/Negative Acknowledgement (ACK/NACK) resource mapping mode on the PUSCH;
- determine resource elements for transmitting ACK/NACK information based, at least in part, on the first resource block for transmitting the PUSCH and the ACK/NACK resource mapping mode on the PUSCH; and
- transmit the ACK/NACK information on the determined resource elements, wherein the received signalling includes a radio resource control (RRC) message or downlink control information, wherein to transmit the ACK/NACK information, the UE is to:
- transmit the ACK/NACK information on the resource elements within four symbols adjacent to an Uplink Reference Signal (UL RS) having an upper bound of 4 discrete Fourier transform spread orthogonal frequency division multiplexing (DFT-S-OFDM) symbols within the PUSCH in the first resource block for transmitting the PUSCH when the ACK/NACK resource mapping mode corresponds to a first ACK/NACK resource mapping mode on the PUSCH; and transmit the ACK/NACK information on the resource elements within one or more than one prescribed resource that is adjacent, in a frequency domain, to the first resource block for transmitting the PUSCH when the ACK/NACK resource mapping mode on the PUSCH corresponds to a second ACK/NACK resource mode mapping on the PUSCH, wherein the one or more than one prescribed resource is within a physical resource block (PRB) adjacent to a highest-indexed PRB associated with PUSCH data of the PUSCH.

2. The one or more non-transitory, computer-readable media of claim 1, wherein the instructions, when executed, further cause the user equipment to report ACK/NACK information using resource elements of said resources other than the first resource block to transmit the PUSCH.

3. The one or more non-transitory, computer-readable media of claim 1, wherein to determine resource elements for transmitting the ACK/NACK information, the user equipment is to allocate resource elements having a predetermined disposition relative to the first resource block to transmit the PUSCH for simultaneous uplink transmission using a common or single Discrete Fourier Transform (DFT).

4. The one or more non-transitory, computer-readable media claim 3, wherein the instructions, when executed, further cause the user equipment to determine a number of component carriers associated with received signals; and to allocate resource elements to transmit the ACK/NACK information having said predetermined disposition relative to the first resource block is responsive to the number of component carriers comprising more than five component carriers.

* * * * *

UNITED STATES PATENT AND TRADEMARK OFFICE
CERTIFICATE OF CORRECTION

PATENT NO. : 10,608,802 B2
APPLICATION NO. : 15/741911
DATED : March 31, 2020
INVENTOR(S) : Hong He et al.

Page 1 of 1

It is certified that error appears in the above-identified patent and that said Letters Patent is hereby corrected as shown below:

In the Claims

Column 36, Line 23, in Claim 4, after "media" insert -- of --.

Signed and Sealed this
Sixteenth Day of June, 2020

Andrei Iancu
*Director of the United States Patent and Trademark Office*